US012375966B2

United States Patent
Xu et al.

(10) Patent No.: US 12,375,966 B2
(45) Date of Patent: Jul. 29, 2025

(54) CROSS-LINK INTERFERENCE MEASUREMENTS FOR CELL DORMANCY

(71) Applicant: QUALCOMM Incorporated, San Diego, CA (US)

(72) Inventors: Huilin Xu, Temecula, CA (US); Peng Cheng, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 415 days.

(21) Appl. No.: 18/001,402

(22) PCT Filed: Jun. 12, 2020

(86) PCT No.: PCT/CN2020/095825
§ 371 (c)(1),
(2) Date: Dec. 9, 2022

(87) PCT Pub. No.: WO2021/248457
PCT Pub. Date: Dec. 16, 2021

(65) Prior Publication Data
US 2023/0224747 A1 Jul. 13, 2023

(51) Int. Cl.
*H04W 24/10* (2009.01)
*H04B 17/336* (2015.01)
*H04W 8/22* (2009.01)

(52) U.S. Cl.
CPC .......... *H04W 24/10* (2013.01); *H04B 17/336* (2015.01); *H04W 8/22* (2013.01)

(58) Field of Classification Search
CPC .............................. H04W 24/10; H04W 8/22
See application file for complete search history.

(56) References Cited

U.S. PATENT DOCUMENTS

| 2015/0208269 A1 | 7/2015 | Damnjanovic et al. |
| 2018/0106841 A1* | 4/2018 | Lurz ...................... G01R 23/02 |
| 2018/0260016 A1* | 9/2018 | Stevenson ............. G06F 1/3262 |
| 2019/0274155 A1* | 9/2019 | Bhattad ................. H04L 5/0073 |

(Continued)

FOREIGN PATENT DOCUMENTS

CN 110913422 A 3/2020

OTHER PUBLICATIONS

Ericsson: "On RAN1 UE Features List for Rel-16 NR", R1-1913102, 3GPP TSG-RNA WG1 Meeting #99, Nov. 9, 2019 (Nov. 9, 2019), pp. 1, 16-20, 17 Pages.

(Continued)

*Primary Examiner* — Zhiren Qin
(74) *Attorney, Agent, or Firm* — Holland & Hart LLP

(57) ABSTRACT

Methods, systems, and devices for wireless communications are described. A UE may identify a non-dormant mode configuration for measuring cross-link interference in a non-dormant mode for a cell. The UE may receive, from a base station, an indication to switch to a dormant mode for the cell and may identify a dormant mode configuration for measuring the cross-link interference in the dormant mode. The UE may measure the cross-link interference in the dormant mode based on the identified dormant mode configuration and receiving the indication to switch to the dormant mode. The UE may transmit, to the base station, an indication of the measured cross-link interference.

35 Claims, 17 Drawing Sheets

(56) References Cited

U.S. PATENT DOCUMENTS

2020/0169341 A1    5/2020    Hwang et al.
2023/0030518 A1*    2/2023    Ren ................... H04W 52/243

OTHER PUBLICATIONS

International Search Report and Written Opinion—PCT/CN2020/095825—ISA/EPO—Mar. 18, 2021 (205226WO1).

Nokia, et al: "On Cross-link Interference Measurement Framework", 3GPP Draft, 3GPP TSG RAN WG1 NR Ad-hoc #3, R1-1715747, On Cross-link Interference Measurement Framework, 3rd Generation Partnership Project (3GPP), Mobile Competence Centre, 650, Route Des Lucioles, F-06921 Sophia-Antipolis Cedex, vol. RAN WG1, No. Nagoya, Japan, Sep. 18, 2017-Sep. 21, 2017, Sep. 17, 2017, XP051339209, 6 pages, sections 1-3.

Qualcomm Incorporated: "Remaining Issues for Scell Dormancy", R1-2002560, 3GPP TSG RAN WG1 #100-e-Bis, Apr. 11, 2020 (Apr. 11, 2020), 8 Pages, the whole document.

ZTE, et al., "Discussion on UE Feature for CLI", 3GPP Draft, R1-2001588, 3GPP TSG RAN WG1 #100bis, 3rd Generation Partnership Project (3GPP), Mobile Competence Centre, 650, Route Des Lucioles, F-06921, Sophia-Antipolis Cedex, France, vol. RAN WG1, No. e-Meeting, Apr. 20, 2020-Apr. 30, 2020, Apr. 11, 2020 (Apr. 11, 2020), XP051875179, 6 Pages, paragraphs [002.] , [02 .1], the whole document.

Huawei, et al., "Overview on CLI Measurements", 3GPP TSG-RAN WG2 Meeting # 107, R2-1911009, 3rd Generation Partnership Project, Mobile Competence Centre, 650, Route Des Lucioles, F-06921 Sophia-Antipolis Cedex, France, vol. RAN WG2, No. Prague, Czech Republic, Aug. 26, 2019-Aug. 30, 2019, Aug. 16, 2019, 5 Pages, XP051768771, chapters 1, 2.

Supplementary European Search Report—EP20939982—Search Authority—Munich—Dec. 18, 2023 (205226EP).

Vivo: "PDCCH-based Power Saving Signal/channel Design", 3GPP TSG RAN WG1 #96bis, R1-1904103, 33rd Generation Partnership Project, Mobile Competence Centre, 650, Route Des Lucioles, F-06921 Sophia-Antipolis Cedex, France, Apr. 2, 2019, 7 pages, XP051707113, chapters 1, 2.

\* cited by examiner

CROSS-LINK INTERFERENCE MEASUREMENTS FOR CELL DORMANCY

CROSS REFERENCES

The present Application is a 371 national stage filing of International PCT Application No. PCT/CN2020/095825 by XU et al. entitled "CROSS-LINK INTERFERENCE MEASUREMENTS FOR CELL DORMANCY," filed Jun. 12, 2020, which is assigned to the assignee hereof, and which is expressly incorporated by reference in its entirety herein.

FIELD OF TECHNOLOGY

The following relates generally to wireless communications and more specifically to cross-link interference measurements for cell dormancy.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some examples, a UE may operate in a dormant mode for a secondary cell with which the UE is communicating. When operating in the dormant mode, the UE may perform operations to limit power consumption. Operations that limit power consumption may increase a battery life of the UE and may accordingly be advantageous to the UE. However, challenges may arise in managing interference when cells are switched to a dormant mode for a UE.

SUMMARY

The described techniques relate to improved methods, systems, devices, and apparatuses that support cross-link interference measurement for a dormant mode. Generally, the described techniques provide methods by which a user equipment (UE) may determine whether to and how to measure cross-link interference in a dormant bandwidth part. For example, a UE may identify a non-dormant mode configuration for measuring cross-link interference in a non-dormant mode for a cell. The UE may receive, from a base station, an indication to switch to a dormant mode for the cell and may identify a dormant mode configuration for measuring the cross-link interference in the dormant mode. The UE may measure the cross-link interference in the dormant mode based on the identified dormant mode configuration and receiving the indication to switch to the dormant mode. The UE may transmit, to the base station, an indication of the measured cross-link interference.

A method of wireless communication at a UE is described. The method may include identifying a first configuration for measuring cross-link interference in a first operation mode for a cell, receiving an indication to switch to a second operation mode for the cell, identifying a second configuration for measuring the cross-link interference in the second operation mode, measuring the cross-link interference in the second operation mode based on the identified second configuration and receiving the indication to switch to the second operation mode, and transmitting an indication of the measured cross-link interference.

An apparatus for wireless communication at a UE is described. The apparatus may include a processor, memory coupled with the processor, and instructions stored in the memory. The instructions may be executable by the processor to cause the apparatus to identify a first configuration for measuring cross-link interference in a first operation mode for a cell, receive an indication to switch to a second operation mode for the cell, identify a second configuration for measuring the cross-link interference in the second operation mode, measure the cross-link interference in the second operation mode based on the identified second configuration and receiving the indication to switch to the second operation mode, and transmit an indication of the measured cross-link interference.

Another apparatus for wireless communication at a UE is described. The apparatus may include means for identifying a first configuration for measuring cross-link interference in a first operation mode for a cell, receiving an indication to switch to a second operation mode for the cell, identifying a second configuration for measuring the cross-link interference in the second operation mode, measuring the cross-link interference in the second operation mode based on the identified second configuration and receiving the indication to switch to the second operation mode, and transmitting an indication of the measured cross-link interference.

A non-transitory computer-readable medium storing code for wireless communication at a UE is described. The code may include instructions executable by a processor to identify a first configuration for measuring cross-link interference in a first operation mode for a cell, receive an indication to switch to a second operation mode for the cell, identify a second configuration for measuring the cross-link interference in the second operation mode, measure the cross-link interference in the second operation mode based on the identified second configuration and receiving the indication to switch to the second operation mode, and transmit an indication of the measured cross-link interference.

Some examples of the method, apparatuses, and non-transitory computer-readable medium described herein may further include operations, features, means, or instructions for transmitting signaling indicating a capability of the UE to measure the cross-link interference in the first operation mode.

Some examples of the method, apparatuses, and non-transitory computer-readable medium described herein may further include operations, features, means, or instructions for transmitting second signaling indicating a second capability of the UE to measure the cross-link interference in the second operation mode, where identifying the second configuration may be based on the second capability.

In some examples of the method, apparatuses, and non-transitory computer-readable medium described herein, the second capability indicates whether the UE supports a first cross-link interference measurement type, a second cross-link interference measurement type, or both.

In some examples of the method, apparatuses, and non-transitory computer-readable medium described herein, the second capability indicates a maximum number of resources configured for the first cross-link interference measurement type, a maximum number of resources configured for the second cross-link interference measurement type, or both.

In some examples of the method, apparatuses, and non-transitory computer-readable medium described herein, the first cross-link interference measurement type includes a received signal strength indicator measurement and the second cross-link interference measurement type includes a reference signal received power measurement.

Some examples of the method, apparatuses, and non-transitory computer-readable medium described herein may further include operations, features, means, or instructions for identifying that the UE supports a first cross-link interference measurement type, a second cross-link interference measurement type, or both, where the second configuration may be associated with one or more resources of the first cross-link interference measurement type and unassociated with any resource of the second cross-link interference measurement type.

Some examples of the method, apparatuses, and non-transitory computer-readable medium described herein may further include operations, features, means, or instructions for identifying a first maximum number of resources for measuring the cross-link interference in the first operation mode, and receiving an indication of a second maximum number of resources for measuring the cross-link interference in the second operation mode, where the second maximum number may be less than the first maximum number based on the second maximum number being associated with the second operation mode, and where measuring the cross-link interference in the second operation mode may be based on the second maximum number.

Some examples of the method, apparatuses, and non-transitory computer-readable medium described herein may further include operations, features, means, or instructions for identifying a set of resources for measuring the cross-link interference in the first operation mode, determining a maximum number of resources for measuring the cross-link interference in the second operation mode, where the maximum number may be smaller than a total number of resources in the set of resources, and selecting a subset of the set of resources based on the determined maximum number of resources, where identifying the second configuration may be based on the selected subset.

Some examples of the method, apparatuses, and non-transitory computer-readable medium described herein may further include operations, features, means, or instructions for identifying a first minimum periodicity for measuring the cross-link interference in the first operation mode, and receiving an indication of a second minimum periodicity associated with the second operation mode, where the second minimum periodicity may be larger than the first minimum periodicity based on the second minimum periodicity being associated with the second operation mode, and where measuring the cross-link interference in the second operation mode may be based on the second minimum periodicity.

Some examples of the method, apparatuses, and non-transitory computer-readable medium described herein may further include operations, features, means, or instructions for identifying a first minimum periodicity for measuring the cross-link interference in the first operation mode, and determining a second minimum periodicity for measuring the cross-link interference in the second operation mode, where the second minimum periodicity may be larger than the first minimum periodicity, and where measuring the cross-link interference in the second operation mode may be based on the second minimum periodicity.

Some examples of the method, apparatuses, and non-transitory computer-readable medium described herein may further include operations, features, means, or instructions for determining that a minimum periodicity for measuring the cross-link interference in the first operation mode may be above a threshold periodicity, where measuring the cross-link interference in the second operation mode may be based on the minimum periodicity being above the threshold periodicity.

In some examples of the method, apparatuses, and non-transitory computer-readable medium described herein, the cross-link interference is measured over a first resource, and the method, apparatuses, and non-transitory computer-readable medium described herein may further include operations, features, means, or instructions for determining that the first resource may be within a threshold time relative to a second resource for receiving a downlink transmission or transmitting an uplink transmission, where measuring the cross-link interference over the first resource may be based on the first resource being within the threshold time.

Some examples of the method, apparatuses, and non-transitory computer-readable medium described herein may further include operations, features, means, or instructions for determining that a third resource may be outside of the threshold time relative to the second resource, and refraining from measuring the cross-link interference over the third resource based on the third resource being outside of the threshold time.

In some examples of the method, apparatuses, and non-transitory computer-readable medium described herein, the second resource includes a channel state information measurement resource or a resource for transmitting a sounding reference signal.

Some examples of the method, apparatuses, and non-transitory computer-readable medium described herein may further include operations, features, means, or instructions for receiving an indication of a measurement bandwidth scaling factor, and determining a reduced bandwidth for measuring the cross-link interference associated with the second configuration based on the indication of the measurement bandwidth scaling factor, where measuring the cross-link interference may be based on the reduced bandwidth.

In some examples of the method, apparatuses, and non-transitory computer-readable medium described herein, the first operation mode may be associated with a first bandwidth part and the second operation mode may be associated with a second bandwidth part, and where the cross-link interference may be measured over the second bandwidth part.

In some examples of the method, apparatuses, and non-transitory computer-readable medium described herein, the indication to switch may be provided via a downlink control information message.

A method of wireless communications is described. The method may include transmitting, to a UE, an indication to switch from a first operation mode to a second operation mode, where the first operation mode is associated with a first configuration for measuring cross-link interference and the second operation mode is associated with a second configuration for measuring the cross-link interference and receiving, from the UE, an indication of the measured cross-link interference based on the second configuration and transmitting the indication.

An apparatus for wireless communications is described. The apparatus may include a processor, memory coupled with the processor, and instructions stored in the memory. The instructions may be executable by the processor to cause the apparatus to transmit, to a UE, an indication to switch from a first operation mode to a second operation mode, where the first operation mode is associated with a first configuration for measuring cross-link interference and the second operation mode is associated with a second configuration for measuring the cross-link interference and receive, from the UE, an indication of the measured cross-link interference based on the second configuration and transmitting the indication.

Another apparatus for wireless communications is described. The apparatus may include means for transmitting, to a UE, an indication to switch from a first operation mode to a second operation mode, where the first operation mode is associated with a first configuration for measuring cross-link interference and the second operation mode is associated with a second configuration for measuring the cross-link interference and receiving, from the UE, an indication of the measured cross-link interference based on the second configuration and transmitting the indication.

A non-transitory computer-readable medium storing code for wireless communications is described. The code may include instructions executable by a processor to transmit, to a UE, an indication to switch from a first operation mode to a second operation mode, where the first operation mode is associated with a first configuration for measuring cross-link interference and the second operation mode is associated with a second configuration for measuring the cross-link interference and receive, from the UE, an indication of the measured cross-link interference based on the second configuration and transmitting the indication.

Some examples of the method, apparatuses, and non-transitory computer-readable medium described herein may further include operations, features, means, or instructions for receiving signaling indicating a capability of the UE to measure the cross-link interference in the first operation mode.

Some examples of the method, apparatuses, and non-transitory computer-readable medium described herein may further include operations, features, means, or instructions for receiving second signaling indicating a second capability of the UE to measure the cross-link interference in the second operation mode where receiving the indication of the measured cross-link interference may be based on receiving the second capability.

In some examples of the method, apparatuses, and non-transitory computer-readable medium described herein, the second capability indicates whether the UE supports a first cross-link interference measurement type, a second cross-link interference measurement type, or both.

In some examples of the method, apparatuses, and non-transitory computer-readable medium described herein, the second capability indicates a maximum number of resources configured for the first cross-link interference measurement type, a maximum number of resources configured for the second cross-link interference measurement type, or both.

In some examples of the method, apparatuses, and non-transitory computer-readable medium described herein, the first cross-link interference measurement type includes a received signal strength indicator measurement, and the second cross-link interference measurement type includes a reference signal received power measurement.

Some examples of the method, apparatuses, and non-transitory computer-readable medium described herein may further include operations, features, means, or instructions for identifying a first maximum number of resources for measuring the cross-link interference in the first operation mode, and transmitting, to the UE, a second maximum number of resources for measuring the cross-link interference in the second operation mode, where the second maximum number may be less than the first maximum number based on the second maximum number being associated with the second operation mode.

Some examples of the method, apparatuses, and non-transitory computer-readable medium described herein may further include operations, features, means, or instructions for identifying a first minimum periodicity for measuring the cross-link interference in the first operation mode, and transmitting, to the UE, an indication of a second minimum periodicity associated with the second operation mode, where the second minimum periodicity larger than the first minimum periodicity based on the second minimum periodicity being associated with the second operation mode.

Some examples of the method, apparatuses, and non-transitory computer-readable medium described herein may further include operations, features, means, or instructions for transmitting, to the UE, an indication of a measurement bandwidth scaling factor, where receiving the indication of the measured cross-link interference may be based on transmitting the indication of measurement bandwidth scaling factor.

In some examples of the method, apparatuses, and non-transitory computer-readable medium described herein, the first operation mode may be associated with a first bandwidth part and the second operation mode may be associated with a second bandwidth part, and where the cross-link interference may be measured over the second bandwidth part.

In some examples of the method, apparatuses, and non-transitory computer-readable medium described herein, the indication to switch may be provided via a downlink control information message.

DETAILED DESCRIPTION

Figure 1:
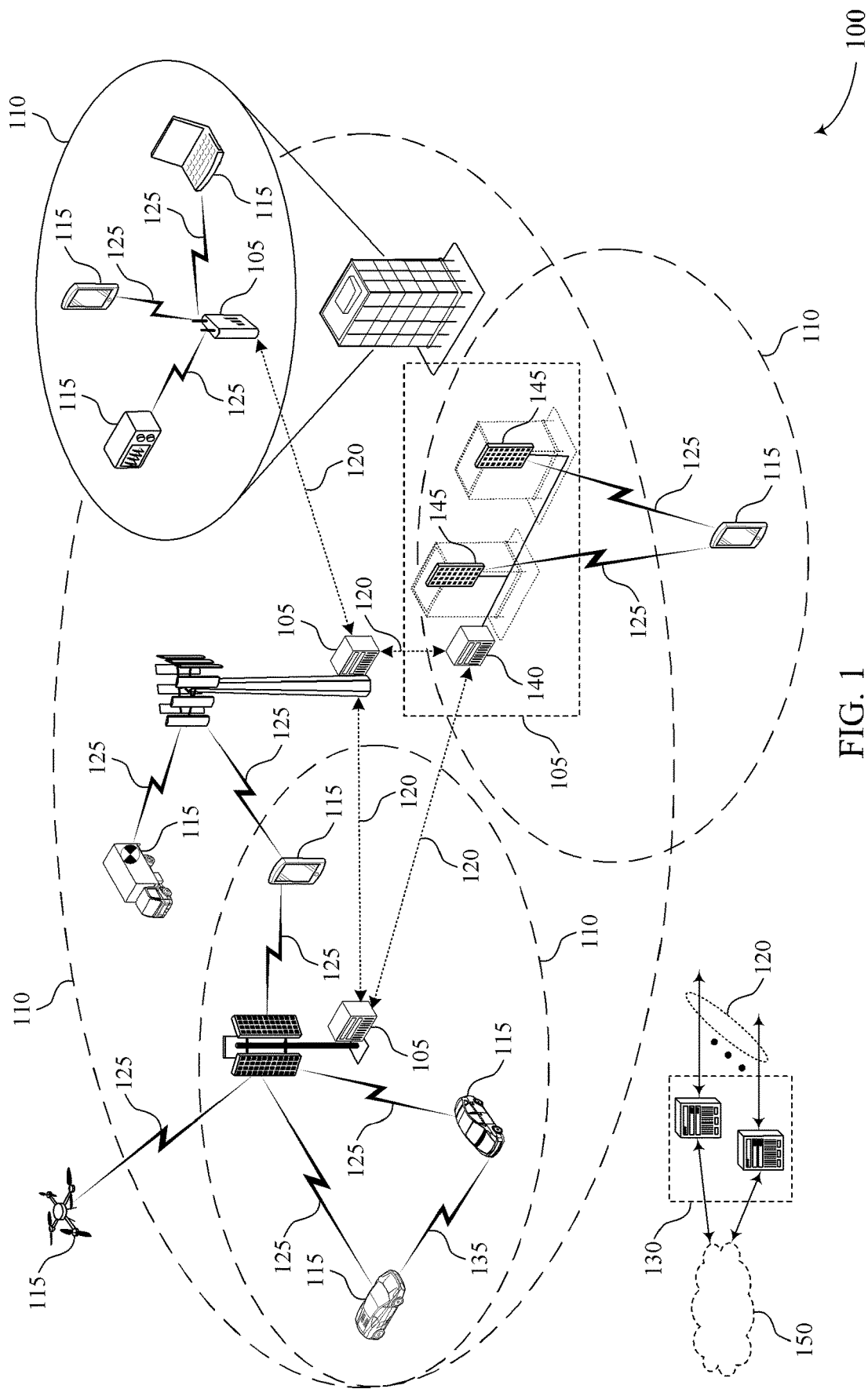
FIG. 1 illustrates an example of a wireless communications system that supports cross-link interference measurement for a dormant mode in accordance with aspects of the present disclosure.

A base station and a user equipment (UE) may perform time division duplexing (TDD), in which each symbol of each slot may be one of a downlink symbol, an uplink symbol, or a flexible symbol. Downlink symbols may be used for downlink communications from a base station, uplink symbols may be used for uplink communications to a base station, and flexible symbols may be used for either communication. In some examples, a UE operating in a first cell may interfere with a UE operating in another cell due to the UE in the first cell (e.g., an aggressor UE) having an uplink or flexible symbol while the other UE operating in the other cell (e.g., a victim UE) has a downlink or flexible symbol. Such interference may be referred to as cross link interference (CLI). To mitigate CLI, the victim UE may measure CLI and may report the measured CLI to a scheduling base station. The UE may measure the CLI over resources associated with a first measurement type (e.g., CLI received signal strength indicator (RSSI)) or over resources associated with a second measurement type (e.g., sounding reference signal (SRS) reference signal received power (SRS-RSRP)).

Additionally, the victim UE may operate in a dormant mode or a non-dormant mode for the cell. In the dormant mode, one or more operations of the victim UE may be limited to enable the victim UE to conserve power. Additionally, in the dormant mode, the victim UE may communicate over a dormant bandwidth part (BWP) different from the BWP over which the victim UE communicates in the non-dormant mode.

The techniques as described herein may enable a UE to consume less power when measuring CLI while operating in a dormant mode. For example, when measuring CLI, the victim UE may consume more power as a measurement periodicity decreases, as a number of CLI measurement resources increases, as a CLI measurement bandwidth increases, or any combination thereof. Additionally, the victim UE may consume less power when measuring CLI of a first measurement resource type (e.g., CLI RSSI) as compared to measuring CLI of a second measurement type (e.g., SRS-RSRP). Accordingly, to enable the victim UE to reduce power consumption when performing CLI measurements in the dormant mode, the victim UE may identify a non-dormant configuration for measuring CLI in a non-dormant mode and a dormant configuration for measuring CLI in a dormant mode. The dormant configuration may be associated with an increased measurement periodicity, a decreased number of CLI measurement resources, a decreased CLI measurement bandwidth, a decreased number of CLI resources of a measurement type associated with higher power consumption (e.g., a decreased number of SRS-RSRP resources), an increased number of CLI resources of a measurement type associated with lower power consumption (e.g., an increased number of CLI RSSI resources), or any combination thereof as compared to the non-dormant mode.

Aspects of the disclosure are initially described in the context of wireless communications systems. Additional aspects of the disclosure are described in the context of an additional wireless communications system, an operation mode switching scheme, resource coupling schemes, and a process flow. Aspects of the disclosure are further illustrated by and described with reference to apparatus diagrams, system diagrams, and flowcharts that relate to cross-link interference measurement for a dormant mode.

FIG. 1 illustrates an example of a wireless communications system 100 that supports cross-link interference measurement for a dormant mode in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may operation in the presence of other wireless networks, for example a wireless local area network (WLAN), such as a Wi-Fi (i.e., Institute of Electrical and Electronics Engineers (IEEE) 802.11). A Wi-Fi network may include an access point (AP) that may communicate with one or more wireless or mobile devices. The AP may be coupled to a network, such as the Internet, and may enable a mobile device to communicate via the network (or communicate with other devices coupled to the access point). A wireless device may communicate with a network device bi-directionally. For example, in a WLAN, a device may communicate with an associated AP via downlink (e.g., the communication link from the AP to the device) and uplink (e.g., the communication link from the device to the AP). A wireless personal area network (PAN), which may include a Bluetooth connection, may provide for short range wireless connections between two or more paired wireless devices. For example, wireless devices such as cellular phones may utilize wireless PAN communications to exchange information such as audio signals with wireless headsets.

Generally, the described techniques provide methods by which a UE 115 may determine whether to and how to measure cross-link interference when in a dormant mode for a cell. For example, a UE 115 may identify a first configuration measuring cross-link interference in a first operation mode (e.g., a non-dormant mode) for a cell. The UE 115 may receive, from a base station 105, an indication to switch to a second operation mode for the cell (e.g., a dormant mode) and may identify a second configuration for measuring the cross-link interference in the second operation mode. The UE 115 may measure the cross-link interference in the second operation mode based on the identified second configuration and receiving the indication to switch to the second operation mode. The UE 115 may transmit, to the base station 105, an indication of the measured cross-link interference.

Figure 2:
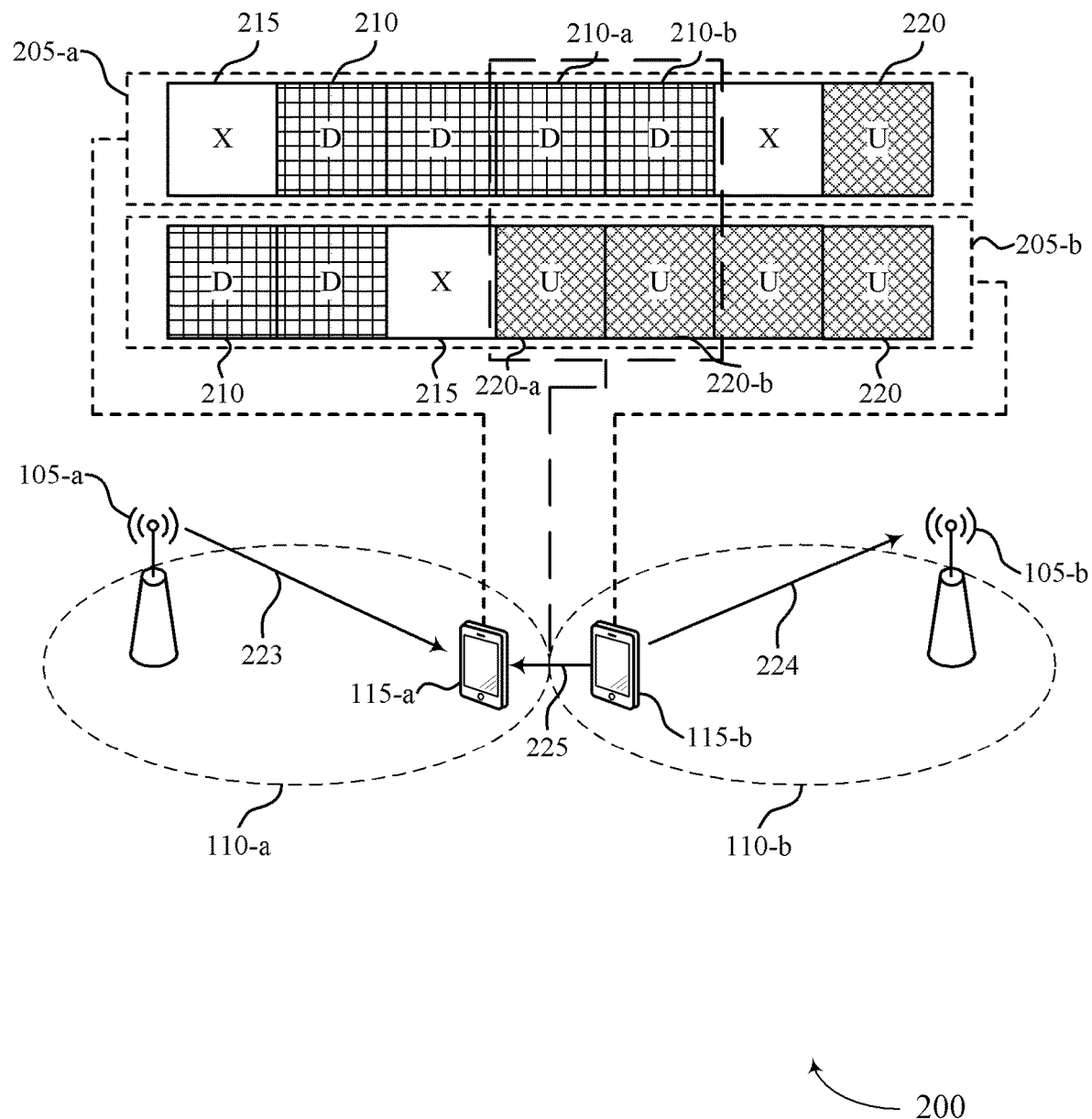
FIG. 2 illustrates an example of a wireless communications system that supports cross-link interference measurement for a dormant mode in accordance with aspects of the present disclosure.

FIG. 2 illustrates an example of a wireless communications system 200 that supports cross-link interference measurement for a dormant mode in accordance with aspects of the present disclosure. In some examples, wireless communications system 200 may implement aspects of wireless communications system 100. For instance, UEs 115-*a* and 115-*b* may be examples of UEs 115 as described with reference to FIG. 1 and base stations 105-*a* and 105-*b* may be examples of base stations 105 as described with reference to FIG. 1.

The UEs 115-*a* and 115-*b* may each have a respective format, such as a TDD uplink-downlink slot format 205. For example, the UE 115-*a* may have an associated slot format 205-*a* and the UE 115-*b* may have an associated slot format 205-*b*. Each slot format 205 may configure a type for one or more symbols. For example, a slot format 205 may configure a symbol to be a downlink symbol 210, a flexible symbol 215, or an uplink symbol 220. Downlink symbols 210 may be used for downlink communications (e.g., receiving transmission 223 from a base station), uplink symbols 220 may be used for uplink communications (e.g., transmitting transmission 224 to a base station), and flexible symbols 215 may be used for either type of communication. In some examples, each slot may span one or more symbols and, in some examples, may have a uniform length (e.g., each slot may span a same number of symbols).

In some examples, the slot formats 205 of the UEs 115-*a* and 115-*b* may be different (e.g., one or more symbols of slot format 205-*a* may be configured to have a different type than one or more symbols, such as corresponding overlapping symbols, of slot format 205-*b*). For example, an uplink symbol 220 of slot format 205-*b* may overlap with a downlink symbol 210 of slot format 205-*a*. In some examples, uplink symbols 220-*a* and 220-*b* of slot format 205-*b* may overlap with downlink symbols 210-*a* and 210-*b* of slot format 205-*a*, respectively. In such cases, a transmission 224 (e.g., a physical uplink control channel (PUCCH) transmission, a physical uplink shared channel (PUSCH) transmission, a physical random access channel (PRACH) preamble, or SRS) transmitted by the UE 115-*b* in at least one of uplink symbols 220-*a* or 220-*b* may cause interference 225 with the UE 115-*a* while the UE 115-*a* is receiving a transmission 223 from base station 105-*a*. In such a scenario, the UE 115-*a* may be referred to as a victim UE 115, the UE 115-*b* may be referred to as an aggressor UE 115, and interference 225 may be referred to as CLI.

In some examples, the network (e.g., the base station 105-*a*) may configure measurement of the CLI at the victim UE 115 (e.g., the UE 115-*a*) using a measurement type to facilitate CLI management. Examples of the measurement metric may include CLI received signal strength indicator (RSSI) or CLI sounding reference signal (SRS) reference signal received power (RSRP), among others. In cases where the measurement type includes CLI RSSI, the aggressor UE 115 (e.g., the UE 115-*b*) may transmit an SRS to base station 105-*b* that may be measured by the victim UE (e.g., the UE 115-*a*). If the network (e.g., the base station 105-*a*) configures the CLI, for example, via semi-static control signaling (e.g., radio resource control (RRC) signaling), the CLI measurement may be periodic. If the network (e.g., the base station 105-a) configures the CLI, for example, via dynamic control signaling (e.g., downlink control information (DCI)), the CLI measurement may be semi-persistent or aperiodic. The victim UE 115 may perform the CLI measurement over one or more CLI measurement resources and may report the results (e.g., via RRC signaling) to base station 105-a. If the one or more CLI measurement resources are resources configured for measuring SRS-RSRP, UE 115-a may receive an SRS from the aggressor UE and measure RSRP of the received SRS over the one or more resources. Additionally, if the CLI measurement resources are resources configured for measuring CLI RSSI, UE 115-a may measure RSSI over the one or more resources. The measurement resource configuration may be provided in a measurement object (MO) provided by base station 105-a. The measurement resource configuration may include a periodicity, one or more frequency resource blocks (RB) and OFDM symbols where CLI is to be measured.

Figure 3:
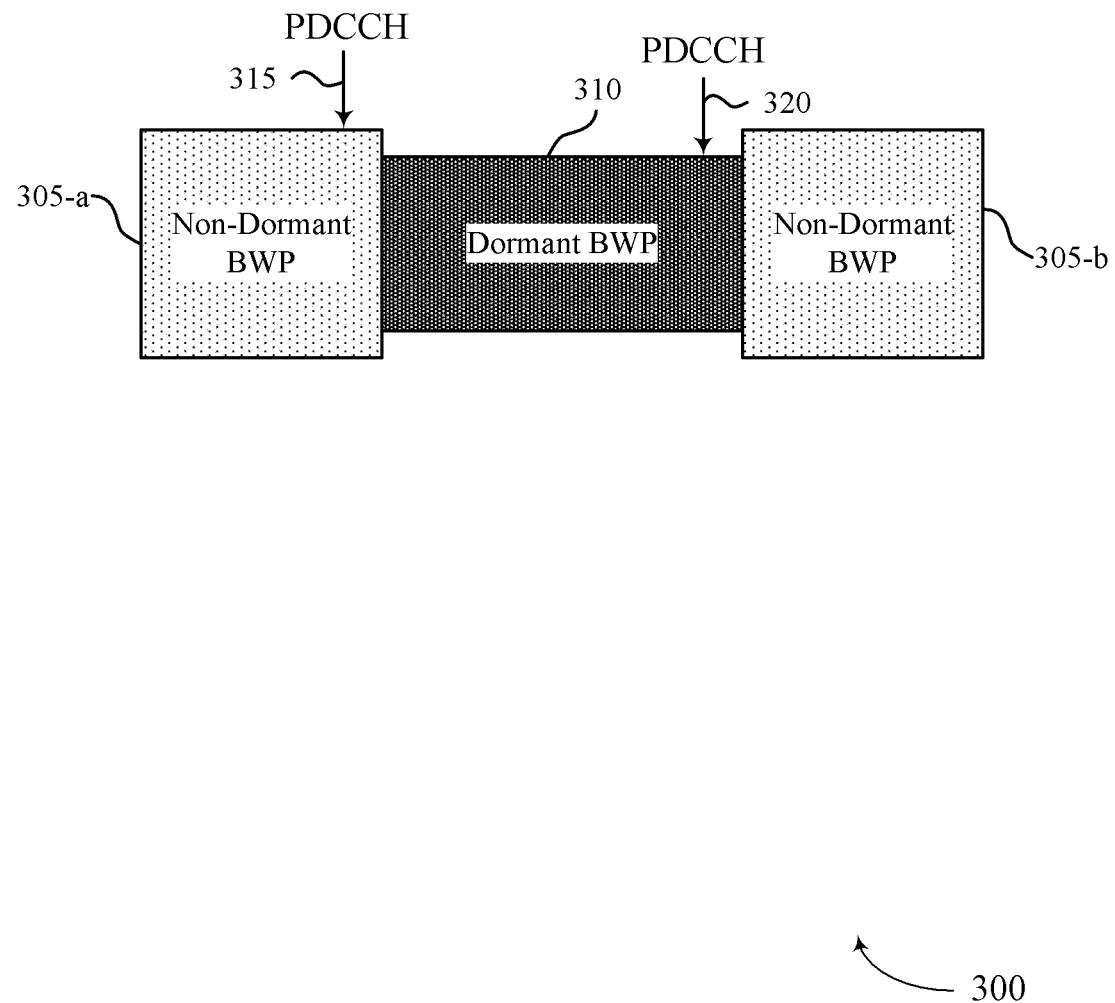
FIG. 3 illustrates an example of an operation mode switching scheme that supports cross-link interference measurement for a dormant mode in accordance with aspects of the present disclosure

FIG. 3 illustrates an example of an operation mode switching scheme 300 that supports cross-link interference measurement for a dormant mode in accordance with aspects of the present disclosure. In some examples, operation mode switching scheme 300 is implemented by one or more aspects of wireless communications systems 100 and/or 200. For instance, operation mode switching scheme 300 may represent a scheme demonstrating how a victim UE 115 (e.g., UE 115-a in FIG. 2) switches from operating in a first BWP to operating in a second BWP.

In some examples, a UE 115 (e.g., UE 115-a) may operate in one operation mode referred to as a dormant mode or another operation mode referred to as a non-dormant mode. The UE behavior in the dormant mode may be referred to or defined as "dormancy" or "dormancy-like" behavior and the UE behavior in the non-dormant mode may be referred to or defined as "normal," "non-dormancy," or "non-dormancy-like" behavior. When the UE 115 is in the non-dormant mode, one or more secondary cells communicating with UE 115 may be configured to perform normal communications with the UE 115 (e.g., the UE performs normal activity on the cell). However, when the UE 115 is in the dormant mode for the cell, the UE 115 may be configured to perform reduced or simplified communications via the cell as described herein. Accordingly, the UE 115 may enter a low activity mode and may, accordingly, have reduced power consumption.

In some examples, the UE 115 may operate in a particular BWP based on an operation mode of the UE 115. For instance, if the UE 115 is in a non-dormant mode, the UE 115 may operate over a non-dormant BWP 305 and if the UE 115 is in a dormant mode, the UE 115 may operate over a dormant BWP 310. When operating in the dormant BWP 310, the UE 115 may have reduced activity as compared to when operating in the non-dormant BWP 305. Additionally bandwidth may be smaller in the dormant BWP 310 (e.g., as wideband operations may not be performed in the dormant BWP 310). Additionally, the UE 115 may not transmit uplink data (e.g., via a PUSCH) or uplink control information (e.g., via a PUCCH) and may not receive data (e.g., via a physical downlink shared channel (PDSCH)) when configured for the dormant BWP 310. In the dormant mode, the UE 115 may not receive downlink control information (e.g., via a physical downlink control channel (PDCCH)). The UE 115, when configured for the dormant BWP 310, may transmit periodic transmission of SRS or perform periodic measurement of channel state information (CSI) with a periodicity longer than that which occurs when the UE 115 is operating in the non-dormant BWP 305. In some examples, the UE 115 may determine to sleep between periods for transmission and/or reception, which may enable the UE 115 to save power. When configured for the non-dormant BWP 305, which may be larger and thus may enable a larger data transmission rate, the UE 115 may have normal activity. The properties of non-dormant BWPs 305 and dormant BWPs 310 may be configured by a base station 105 (e.g., base station 105-a).

In some examples, the UE 115 may receive, from the base station 105, an indication to switch from one operation mode to another operation mode. For instance, the UE 115 may receive DCI via a PDCCH at 315 indicating that the UE 115 is to switch from non-dormant BWP 305-a to dormant BWP 310. Similarly, the UE 115 may receive DCI via a PDCCH at 320 indicating that the UE 115 is to switch from dormant BWP 310 to non-dormant BWP 305-b. Performing this switch may realize a switch between regular behavior (e.g., 'dormancy-like' behavior when configured for the non-dormant BWP 305) and dormancy behavior (e.g., 'non-dormancy-like behavior' when configured for the dormant BWP 310).

Performing CLI measurement may consume more power as a measurement periodicity decreases and/or as a number of measurement resources increases. For instance, the maximum number of SRS-RSRP and CLI RSSI resources may be large enough to enable a heightened consumption of power (e.g., 32 for SRS-RSRP resources and 64 for CLI RSSI resources). Additionally, the minimum periodicity associated with SRS-RSRP resources and CLI RSSI resources may be low enough to substantially heighten consumption of power (e.g., 10 slots for CLI RSSI and 1 slot for SRS-RSRP measurement per resource). Accordingly, performing an SRS-RSRP measurements may involve using more power than CLI RSSI at a per-resource scale. Generally, the UE 115 may operate in the dormant BWP 310 to save more power than when operating in the non-dormant BWP 305. To enable the UE 115 to save additional power, the techniques as described herein may correspond to methods by which a the UE 115 may measure CLI while consuming less power when operating in the dormant BWP 310.

To enable the UE 115 to measure CLI while consuming less power when operating in the dormant BWP 310, the UE 115 may identify a non-dormant configuration (e.g., a first measurement resource configuration provided via an MO) for measuring CLI in a non-dormant mode for a cell and a dormant configuration (e.g., a second measurement resource configuration provided via an MO) for measuring CLI in a dormant power for the cell. The UE 115 may measure CLI over a non-dormant BWP 305 using the non-dormant configuration when the UE 115 is in the non-dormant mode and may measure CLI over a dormant BWP 310 using the dormant configuration when the UE 115 is in the dormant mode. In some examples, the UE 115 may determine that the dormant configuration is associated with one or more resources of the first CLI measurement type and unassociated with one or more resources of the second CLI measurement type. For example, the UE 115 may determine that the UE 115 supports both CLI RSSI and SRS-RSRP in the non-dormant mode, but may determine to select only CLI RSSI resources when configured in the dormant mode. The UE 115 may determine to select only CLI RSSI resources due to the method of measuring SRS-RSRP being more complicated (e.g., have a higher complexity or taking a longer time to complete) than measuring CLI RSSI.

After performing the measuring over the dormant BWP 310 or the non-dormant BWP 305 using the dormant configuration or the non-dormant configuration, respectively, the UE 115 may transmit, to the base station 105, an indication of the measured CLI.

In some examples, the UE 115 may transmit signaling, to the base station 105, indicating a capability of the UE 115 to measure the CLI in the non-dormant mode, which may be referred to as a capability report. For example, the non-dormant mode capability may indicate whether the UE 115 supports a first CLI measurement type (e.g., CLI RSSI), a second measurement type (e.g., SRS-RSRP), or both while operating in the non-dormant mode. Additionally, or alternatively, the non-dormant mode capability may indicate a maximum number of resources configured for the first CLI measurement type, a maximum number of resources configured for the second CLI measurement type, or both in the non-dormant mode. The maximum number of resources may be defined as a number of resources across slots or a number of resources in the slot. The capability may apply to each non-dormant BWP 305-$a$ and 305-$b$, in which the UE 115 may not be exhibiting dormancy behavior (e.g., the capability may not apply in dormant BWP 310). In some such cases, when the UE 115 is operating in dormant BWP 310, the UE 115 may not support the CLI measurement fully following the capability report. Instead, the UE 115 may support a relaxed capability for CLI measurement, which may enable the UE 115 to save power when operating within dormant BWP 310.

Additionally, or alternatively, the UE 115 may report separate capability signaling to the base station 105 for measuring CLI in the dormant BWP 310. For example, the UE 115 may transmit signaling to the base station 105, indicating a capability of the UE 115 to measure the CLI in the dormant mode. The dormant mode capability may indicate whether the UE 115 supports a first CLI measurement type (e.g., CLI RSSI), a second measurement type (e.g., SRS-RSRP), or both while operating in the dormant mode. Additionally, or alternatively, the dormant mode capability may indicate a maximum number of resources configured for the first CLI measurement type, a maximum number of resources configured for the second CLI measurement type, or both in the dormant mode. The dormant mode capability and the non-dormant mode capability may be transmitted in same or separate signaling. The UE 115 may support a lower number of measurement resources for each measurement type (e.g., CLI RSSI, SRS-RSRP) or a less frequent measurement (e.g., a larger minimum periodicity) in the dormant BWP 310 as compared to the non-dormant BWP 305. Additionally, the UE 115 may support one of two measurement types in dormant BWP 310, whereas the non-dormant BWP 305 may support both measurement types. Additionally, or alternatively, the UE 115 may report no support of CLI measurement in the dormant BWP 310.

In some examples, UE CLI measurement behavior in the dormant BWP 310 may be preconfigured. In such cases, if the UE 115 indicates support for performing CLI measurements in the dormant BWP 310 (e.g., by providing a capability report for the dormant BWP 310 as described herein), the UE 115 may perform the preconfigured UE CLI measurement behavior when configured for the dormant BWP 310. Generally, the preconfigured UE CLI measurement behavior in the dormant BWP 310 may include one or more CLI measurement relaxations (e.g., a relaxed timeline) relative to the non-dormant BWP 305.

In some examples, the UE 115 may identify a reduced maximum number of resources for measuring CLI in the dormant mode as compared to the non-dormant mode (e.g., relative to UE capability). The maximum number of resources may be defined as a number of resources across slots or a number of resources in the slot. For example, the UE 115 may identify a first maximum number of resources for measuring CLI in the non-dormant mode and a second maximum number of resources for measuring CLI in the dormant mode, where the second maximum number is less than the first maximum number. In one example, the maximum number of resources configured at the UE 115 may be reduced. For example, the UE 115 may receive, from the base station 105, an indication of the second maximum number of resources. Additionally, or alternatively, the maximum number of resources that the UE 115 may use to measure CLI may be reduced. For example, the UE 115 may determine the second maximum number of resources such that the second maximum number of resources is smaller than a total number of resources in a set of resources for measuring the CLI in the non-dormant mode. When the number of configured resources exceeds the reduced maximum number, the UE 115 may measure a number of resources equal to the reduced maximum number. For example, in order to determine the dormant configuration, the UE 115 may select a subset of the set of resources based on the determined second maximum number of resources. In some examples, the maximum number of resources may be separately defined for resources of a first measurement type (e.g., CLI RSSI) and resources of a second measurement type (e.g., SRS-RSRP). The maximum number of resources may be defined as a number of resources per slot or a total number of resources across slots.

In some examples, the UE 115 may identify an increased shortest or minimum periodicity for CLI measurement. For example, the UE 115 may identify a first minimum periodicity for measuring the CLI in the non-dormant mode and a second minimum periodicity for measuring the CLI in the dormant mode, where the second minimum periodicity is larger than the first minimum periodicity. In one example, the shortest or minimum periodicity of resources configured at the UE 115 may be increased. For example, the UE 115 may receive, from the base station 105, an indication of the second minimum periodicity. Additionally, or alternatively, the shortest or minimum periodicity of resources that the UE 115 may use for measuring CLI may be increased. For example, the UE 115 may determine the second minimum periodicity without receiving an explicit indication from the base station 105. When a periodicity of a configured resources is below a shortest or minimum periodicity that the UE 115 is to handle in the dormant BWP 310, the UE 115 may measure the resource with the shortest or minimum periodicity. Additionally, or alternatively, the UE 115 may not measure CLI if the periodicity of configured resources is below the shortest or minimum periodicity for the dormant mode. In yet another example, the UE 115 may determine that a minimum periodicity for measuring the CLI in the dormant mode is above a threshold periodicity (e.g., 100 ms). In some examples, the shortest or minimum periodicity of resources may be defined separately for CLI RSSI resources and SRS resources.

In some examples, the UE 115 may determine whether to measure over a CLI resource in the dormant BWP 310 based on whether the CLI is within a threshold time from another uplink or downlink resource. For example, if the CLI resource is within a threshold time from or a duration relative to a downlink resource (e.g., a CSI measurement resource) or an uplink resource (e.g., a resource for transmitting SRS), the UE 115 may measure CLI within the CLI resource. However, if the CLI resource is outside of the threshold time from or the duration relative to the downlink resource or the uplink resource, the UE 115 may refrain from measuring CLI within the CLI resource. The threshold time or duration may be determined based on a capability of the UE 115 as described herein or based on a network configuration received from the base station 105. Alternatively, the base station 105 may indicate a network configuration that is configured such that each CLI resource is within the threshold time or duration. In such cases, the UE 115 may measure the CLI in the resources indicated in the network configuration without first performing the determining. In whichever case, the UE 115 may not wake up only to measure CLI, but may also wake up for transmission or reception of other resources. Accordingly, the UE 115 may save power. Examples of one or more of these techniques may be described herein, for example, with reference to FIGS. 3A, 3B, and 3C.

The bandwidth of a CLI measurement may have an impact on power consumption. For example, the larger a bandwidth is, the higher the power consumption for measuring CLI. To mitigate such higher power consumption, the UE 115 may reduce a supported measurement resource bandwidth for CLI RSSI and SRS resource in the dormant BWP 310. In one example, the base station 105 may transmit a network configuration indicating a reduced measurement resource bandwidth. Alternatively, the base station 105 may configure the base station 105 with a measurement bandwidth scaling factor. For example, the UE 115 may receive an indication of a measurement bandwidth scaling factor from the base station 105. The UE 115 may apply the scaling factor (e.g., with a value less than 1) in dormancy so that the measurement bandwidth is reduced. For example, the UE 115 may use the measurement bandwidth scaling factor to determine a reduced bandwidth for measuring the CLI associated with the dormant configuration. In some examples, when CLI measurement bandwidth is reduced, a restriction that a CLI SRS is measured by the UE 115 only if fully contained by the bandwidth of the BWP may be relaxed in the dormant BWP 310. Accordingly, the UE 115 may measure SRS in the dormant BWP, even if the dormant BWP 310 is narrower than the SRS resource. In some examples, CLI RSSI and SRS resources may be configured across BWPs (e.g., across dormant BWPs 310 and non-dormant BWPs 305).

Performing the methods as described herein may have one or more advantages. For example, the UE 115 may achieve greater power savings in the dormant mode by using a dormant configuration, which may involve the UE 115 measuring CLI over fewer resources, measuring CLI with a longer periodicity, measuring only CLI RSSI resources, measuring CLI over a reduced bandwidth, or any combination thereof. Additionally, by determining whether to measure CLI based on a proximity of CLI resources to other resources, the UE 115 may wake up a fewer amount of times, which may also achieve a power consumption.

Figure 4A:
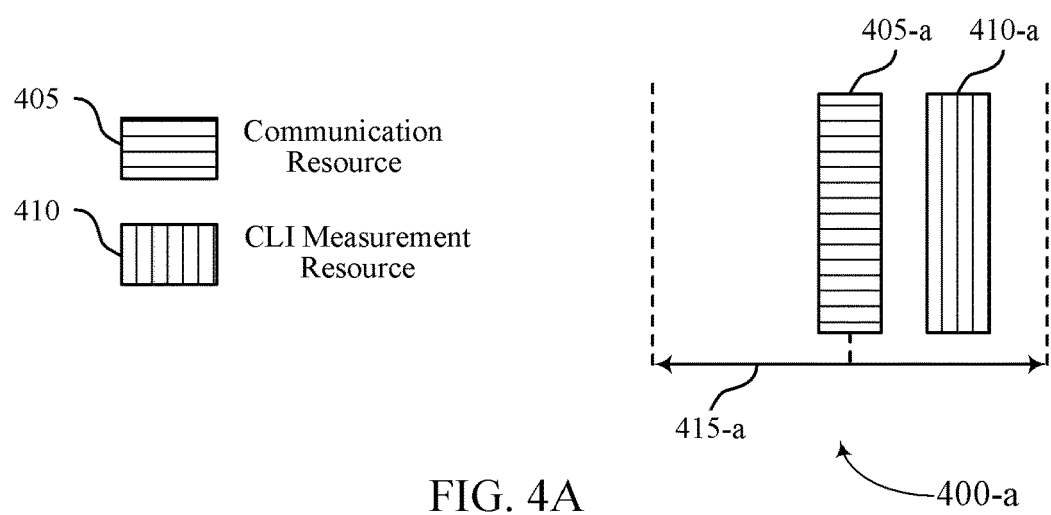
FIGS. 4A, 4B, and 4C illustrate examples of a resource coupling scheme that supports cross-link interference measurement for a dormant mode in accordance with aspects of the present disclosure.
Figure 4B:
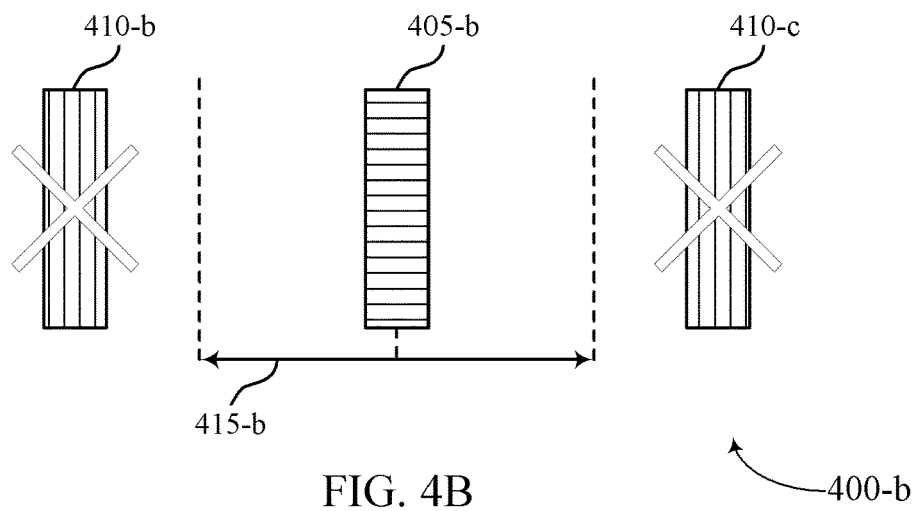
Figure 4C:
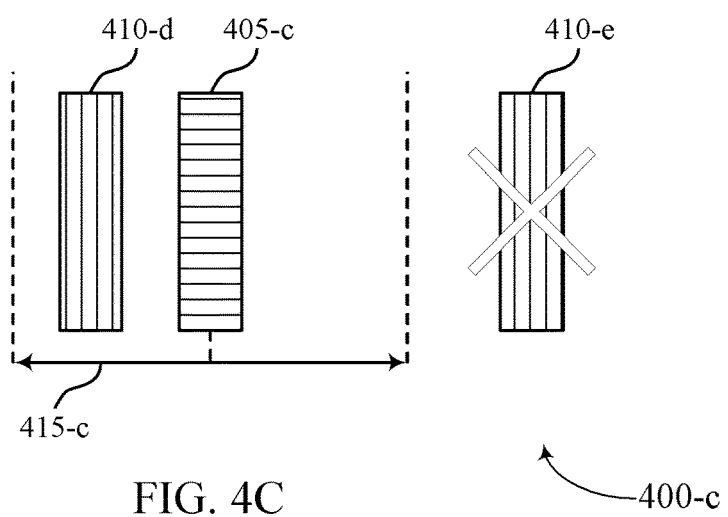

FIGS. 4A, 4B and 4C illustrate examples of resource coupling schemes 400-a, 400-b, and 400-c that support cross-link interference measurement for a dormant mode in accordance with aspects of the present disclosure. In some examples, resource coupling schemes 400-a, 400-b, and 400-c may implement aspects of wireless communications system 100. For instance, resource coupling schemes 400-a, 400-b, and 400-c may represent schemes demonstrating how a UE 115 as described with reference to FIG. 1 determines whether to measure CLI over a scheduled or configured CLI measurement resource.

In some examples, a UE 115 may determine whether to measure over a CLI resource 410 in a dormant BWP based on whether the CLI is within a threshold time 415 from a communication resource 405. For example, if the CLI resource 410 is within a threshold time 415 from or a duration relative to a communication resource 405 (e.g., a CSI measurement resource or a resource for transmitting SRS), the UE 115 may measure CLI within the CLI resource 410. However, if the CLI resource 410 is outside of the threshold time 415 from the communication resource 405, the UE 115 may refrain from measuring CLI within the CLI resource.

For example, as demonstrated in FIG. 4A, a CLI resource 410-a may be within a threshold time 415-a of communication resource 405-a. Accordingly, a UE 115 may measure CLI over the CLI resource 410-a. However, as demonstrated in FIG. 4B, CLI resources 410-b and 410-c may not be within a threshold time 415-b of communication resource 405-b. Accordingly, the UE 115 may refrain from measuring CLI over the CLI resources 410-b and 410-c. As demonstrated in FIG. 4C, CLI resource 410-d may be within a threshold time 415-c of communication resource 405-c. However, CLI resource 410-e may not be within the threshold time 415-c of communication resource 405-c. Accordingly, the UE 115 may measure CLI over CLI resource 410-d but may not measure CLI over CLI resource 410-e.

Figure 5:
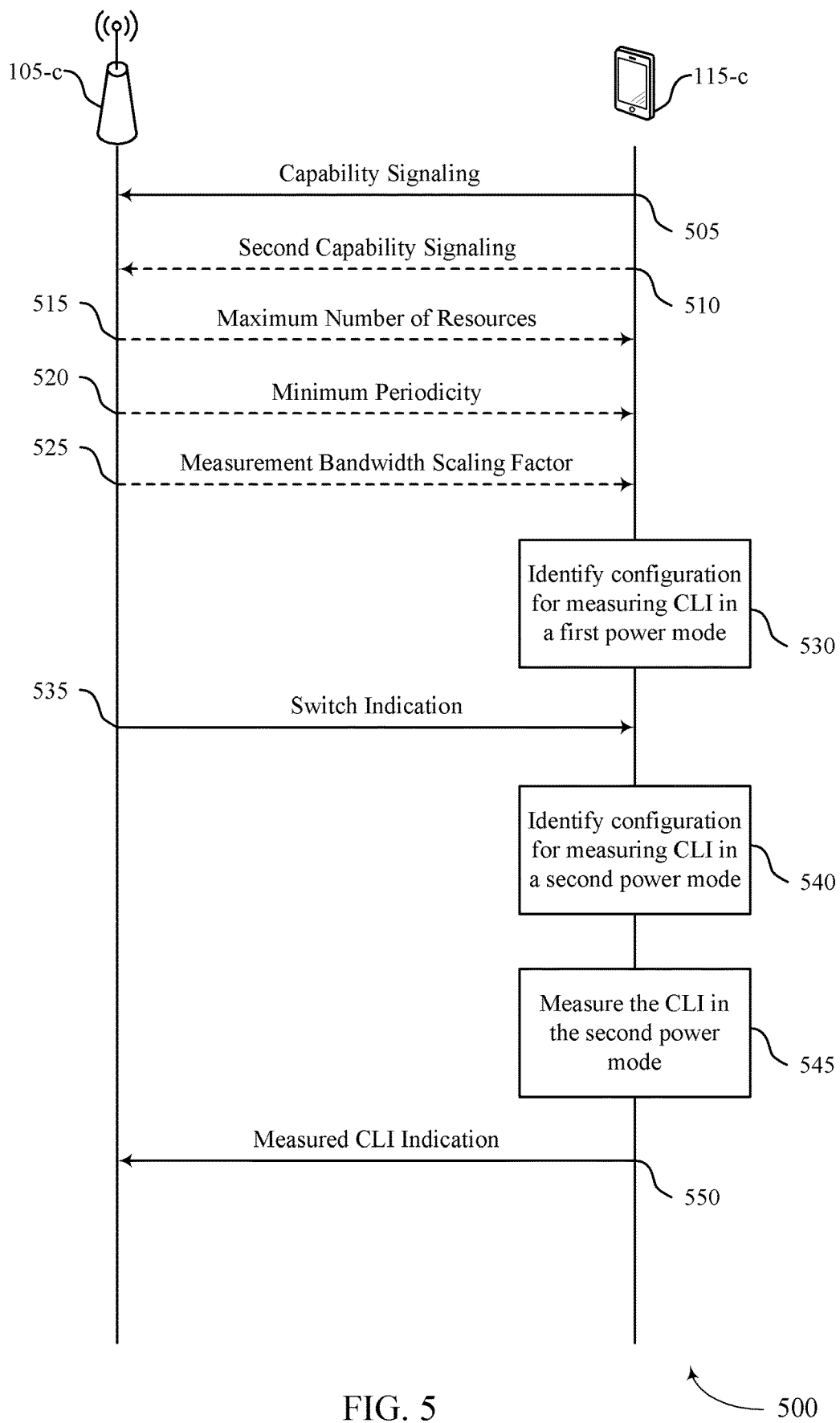
FIG. 5 illustrates an example of a process flow that supports cross-link interference measurement for a dormant mode in accordance with aspects of the present disclosure.

FIG. 5 illustrates an example of a process flow 500 that supports cross-link interference measurement for a dormant mode in accordance with aspects of the present disclosure. In some examples, process flow 500 may implement aspects of wireless communications system 100. For example, UE 115-c may be an example of a UE 115 as described with reference to FIG. 1 and base station 105-c may be an example of a base station 105 as described with reference to FIG. 1.

At 505, UE 115-c may transmit signaling indicating a first capability of UE 115-c to measure CLI in a first operation mode (e.g., a non-dormant mode). Base station 105-c may receive the signaling. The first capability may indicate whether UE 115-c supports a first CLI measurement type (e.g., CLI RSSI), a second CLI measurement type (e.g., SRS-RSRP), or both in the first operation mode. The first capability may indicate a maximum number of resources configured for the first CLI measurement type, a maximum number of resources configured for the second CLI measurement type, or both in the first operation mode. In some examples, the first operation mode may be associated with a first BWP. The signaling may be transmitted via a transmitter of UE 115-c and received via a receiver of base station 105-c.

At 510, UE 115-c may transmit second signaling indicating a second capability of UE 115-c to measure the CLI in the second operation mode (e.g., a dormant mode). Base station 105-c may receive the second signaling. The second capability may indicate whether UE 115-c supports a first CLI measurement type (e.g., CLI RSSI), a second CLI measurement type (e.g., SRS-RSRP), or both in the second operation mode. The second capability may indicate a maximum number of resources configured for the first CLI measurement type, a maximum number of resources configured for the second CLI measurement type, or both in the second operation mode. In some examples, the second operation mode may be associated with a second BWP. The second signaling may be transmitted via a transmitter of UE 115-c and received via a receiver of base station 105-c.

At 515, base station 105-c may transmit an indication of a maximum number of resources for measuring the CLI in the second operation mode. UE 115-*c* may receive the indication of the maximum number of resources in the second operation mode. In some examples, UE 115-*c* may identify a maximum number of resources for measuring the CLI in the first operation mode. In such cases, the maximum number of resources in the second operation mode may be less than the maximum number of resources in the first operation mode based on the maximum number of resources in the second operation mode being associated with the second operation mode. Additionally, or alternatively, UE 115-*c* may identify a set of resources for measuring the CLI in the first operation mode; determine a maximum number of resources for measuring the CLI in the second operation mode, where the maximum number is smaller than a total number of resources in the set of resources; and may select a subset of the set of resources based on the determined maximum number of resources. The indication of the maximum number of resources for measuring the CLI in the second operation mode may be transmitted via a transmitter of UE 115-*c* and received via a receiver of base station 105-*c*.

At 520, base station 105-*c* may transmit an indication of a minimum periodicity associated with the second operation mode. UE 115-*c* may receive the indication of the minimum periodicity in the second operation mode. In some examples, UE 115-*c* may identify a minimum periodicity for measuring the CLI in the first operation mode. In such cases, the minimum periodicity in the second operation mode may be larger than the minimum periodicity in the first operation mode based on the minimum periodicity in the second operation mode being associated with the second operation mode. Additionally, or alternatively, UE 115-*c* may identify a first minimum periodicity for measuring the CLI in the first operation mode and may determine a second minimum periodicity for measuring the CLI in the second operation mode, where the second minimum periodicity is larger than the first minimum periodicity. Additionally, or alternatively, UE 115-*c* may determine that a minimum periodicity for measuring the CLI in the first operation mode is above a threshold periodicity. The indication of the minimum periodicity for measuring the CLI in the second operation mode may be transmitted via a transmitter of UE 115-*c* and received via a receiver of base station 105-*c*.

At 525, base station 105-*c* may transmit an indication of a measurement bandwidth scaling factor. UE 115-*c* may receive the indication of the measurement bandwidth scaling factor. UE 115-*c* may identify the measurement bandwidth scaling factor from the received indication. The indication of the measurement bandwidth scaling factor may be transmitted via a transmitter of UE 115-*c* and received via a receiver of base station 105-*c*.

At 530, UE 115-*c* may identify a first configuration for measuring CLI in the first operation mode. In some examples, identifying the first configuration is based on the first capability (e.g., received at 505). The first configuration may include a measurement resource configuration as described with reference to FIG. 2. UE 115-*c* may identify the first configuration using a controller or processor.

At 535, base station 105-*c* may transmit an indication to switch to the second operation mode for the cell. UE 115-*c* may receive the indication to switch. The indication to switch may be provided via a DCI message. Base station 105-*c* may transmit the indication to switch via a transmitter and UE 115-*c* may receive the indication to switch via a receiver.

At 540, UE 115-*c* may identify a second configuration (e.g., a second set of resources, a second maximum number of resources, a second minimum periodicity) for measuring the CLI in the second operation mode. In some cases, UE 115-*c* may determine a reduced bandwidth for measuring the CLI associated with the second based on the indication of the measurement bandwidth scaling factor. In some examples, the second configuration is based on the second capability (e.g., received at 510). In some examples, the second configuration may be associated with one or more resources of the first CLI measurement type (e.g., CLI RSSI) and unassociated with any resource of the second CLI measurement type (e.g., SRS-RSRP). In some examples, identifying the second configuration may be based on selecting a subset of a set of resources for measuring the CLI in the first operation mode. UE 115-*c* may identify the second configuration using a controller or processor.

At 545, UE 115-*c* may measure the CLI in the second operation mode based on the identified second configuration and receiving the indication to switch to the second operation mode. In some examples, measuring the CLI in the second operation mode may be based on the maximum number of resources in the second operation mode (e.g., transmitted at 515), the minimum periodicity in the second operation mode (e.g., transmitted at 520), or both. In some examples, measuring the CLI in the second operation mode is based on the minimum periodicity in the second operation mode being above a threshold periodicity. In some examples, measuring the CLI is based on a reduced bandwidth determined according to a measurement bandwidth scaling factor (e.g., received at 525). UE 115-*c* may measure the CLI using a receiver.

In some examples, the CLI is measured over a first resource. In such cases, UE 115-*c* may determine that the first resource is within a threshold time relative to a second resource for receiving a downlink transmission (e.g., a CSI-RS measurement resource) or transmitting an uplink transmission (e.g., a resource for transmitting an SRS). In such cases, UE 115-*c* may measure the CLI over the first resource based on the first resource being within the threshold time. Additionally, UE 115-*c* may determine that a third resource is outside of the threshold time relative to the second resource. In such cases, UE 115-*c* may refrain from measuring the CLI over the third resource based on the third resource being outside of the threshold time.

At 550, UE 115-*c* may transmit an indication of the measured CLI (e.g., a CLI report). Base station 105-*c* may receive the indication of the measured CLI. In some examples, base station 105-*c* may use the indication of the measured CLI to perform scheduling. UE 115-*c* may transmit the indication of the measured CLI via a transmitter and base station 105-*c* may receive the indication of the measured CLI via a receiver.

Figure 6:
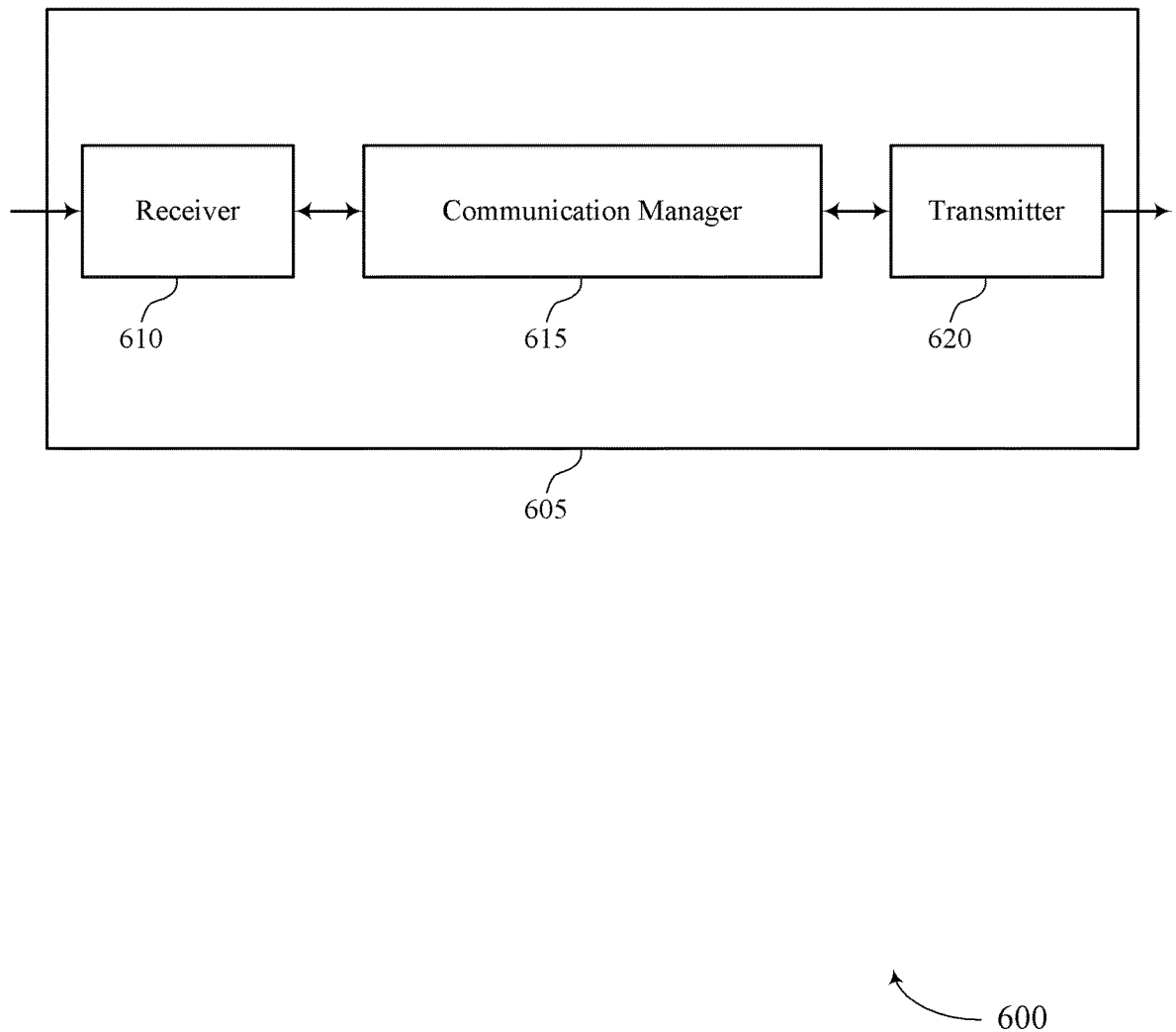
FIGS. 6 and 7 show block diagrams of devices that support cross-link interference measurement for a dormant mode in accordance with aspects of the present disclosure.

FIG. 6 shows a block diagram 600 of a device 605 that supports cross-link interference measurement for a dormant mode in accordance with aspects of the present disclosure. The device 605 may be an example of aspects of a UE 115 as described herein. The device 605 may include a receiver 610, a communication manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to cross-link interference measurement for a dormant mode, etc.). Information may be passed on to other components of the device 605. The receiver 610 may be an example of aspects of the transceiver 915 described with reference to FIG. 8. The receiver 610 may utilize a single antenna or a set of antennas.

The communication manager 615 may identify a first configuration for measuring cross-link interference in a first operation mode for a cell, receive an indication to switch to a second operation mode for the cell, identify a second configuration for measuring the cross-link interference in the second operation mode, measure the cross-link interference in the second operation mode based on the identified second configuration and receiving the indication to switch to the second operation mode, and transmit an indication of the measured cross-link interference. The communication manager 615 may be an example of aspects of the communication manager 910 described herein.

The communication manager 615, or its sub-components, may be implemented in hardware, code (e.g., software or firmware) executed by a processor, or any combination thereof. If implemented in code executed by a processor, the functions of the communication manager 615, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communication manager 615, or its sub-components, may be physically located at various positions, including being distributed such that portions of functions are implemented at different physical locations by one or more physical components. In some examples, the communication manager 615, or its sub-components, may be a separate and distinct component in accordance with various aspects of the present disclosure. In some examples, the communication manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 915 described with reference to FIG. 8. The transmitter 620 may utilize a single antenna or a set of antennas.

Figure 7:
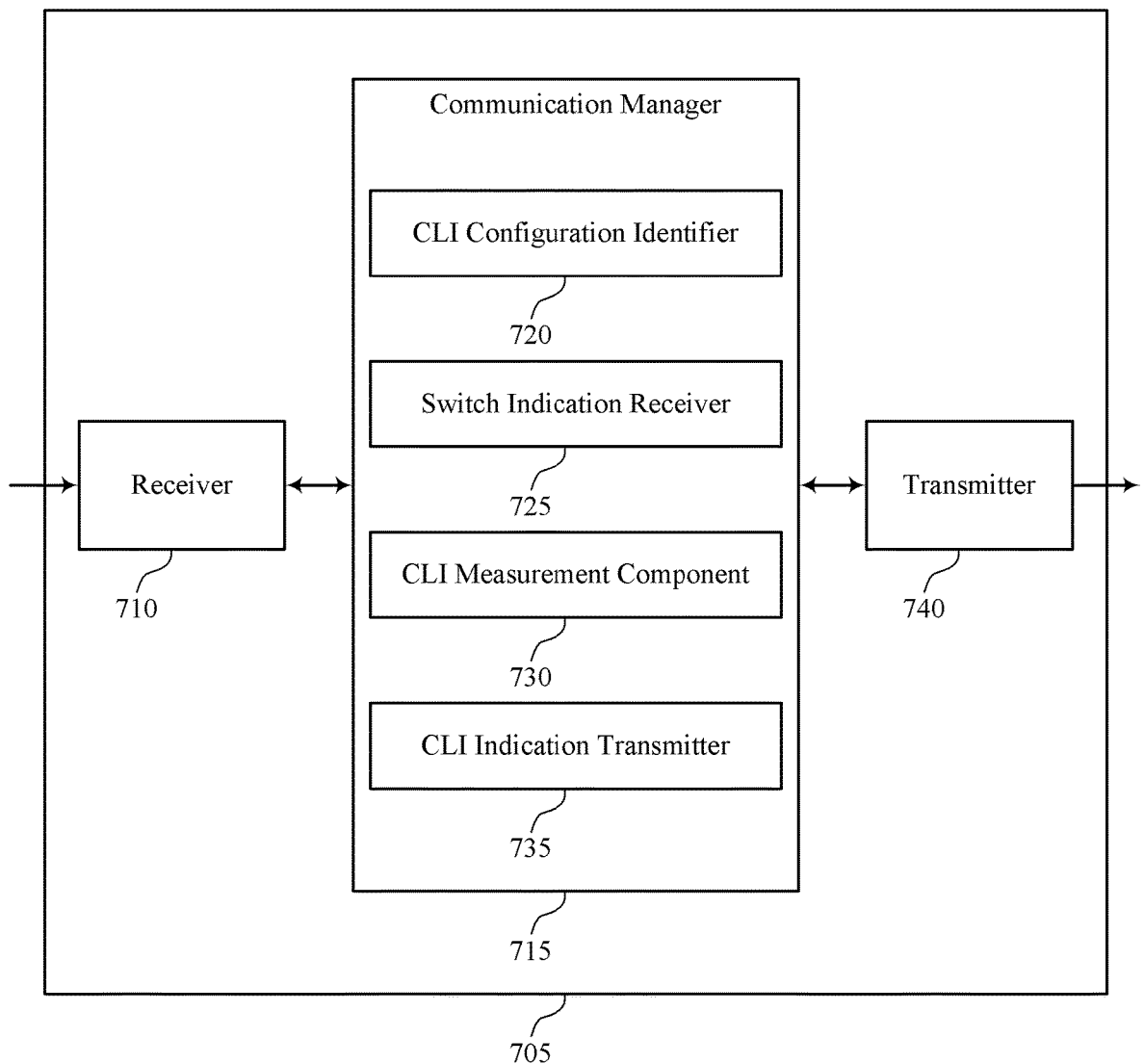

FIG. 7 shows a block diagram 700 of a device 705 that supports cross-link interference measurement for a dormant mode in accordance with aspects of the present disclosure. The device 705 may be an example of aspects of a device 605, or a UE 115 as described herein. The device 705 may include a receiver 710, a communication manager 715, and a transmitter 740. The device 705 may also include a processor. Each of these components may be in communication with one another (e.g., via one or more buses).

The receiver 710 may receive information such as packets, user data, or control information associated with various information channels (e.g., control channels, data channels, and information related to cross-link interference measurement for a dormant mode, etc.). Information may be passed on to other components of the device 705. The receiver 710 may be an example of aspects of the transceiver 915 described with reference to FIG. 8. The receiver 710 may utilize a single antenna or a set of antennas.

The communication manager 715 may be an example of aspects of the communication manager 615 as described herein. The communication manager 715 may include a CLI configuration identifier 720, a switch indication receiver 725, a CLI measurement component 730, and a CLI indication transmitter 735. The communication manager 715 may be an example of aspects of the communication manager 910 described herein.

The CLI configuration identifier 720 may identify a first configuration for measuring cross-link interference in a first operation mode for a cell and identify a second configuration for measuring the cross-link interference in the second operation mode.

The CLI indication transmitter 735 may transmit an indication of the measured cross-link interference.

The CLI measurement component 730 may measure the cross-link interference in the second operation mode based on the identified second configuration and receiving the indication to switch to the second operation mode.

The switch indication receiver 725 may receive an indication to switch to a second operation mode for the cell.

The transmitter 740 may transmit signals generated by other components of the device 705. In some examples, the transmitter 740 may be collocated with a receiver 710 in a transceiver module. For example, the transmitter 740 may be an example of aspects of the transceiver 915 described with reference to FIG. 8. The transmitter 740 may utilize a single antenna or a set of antennas.

Figure 8:
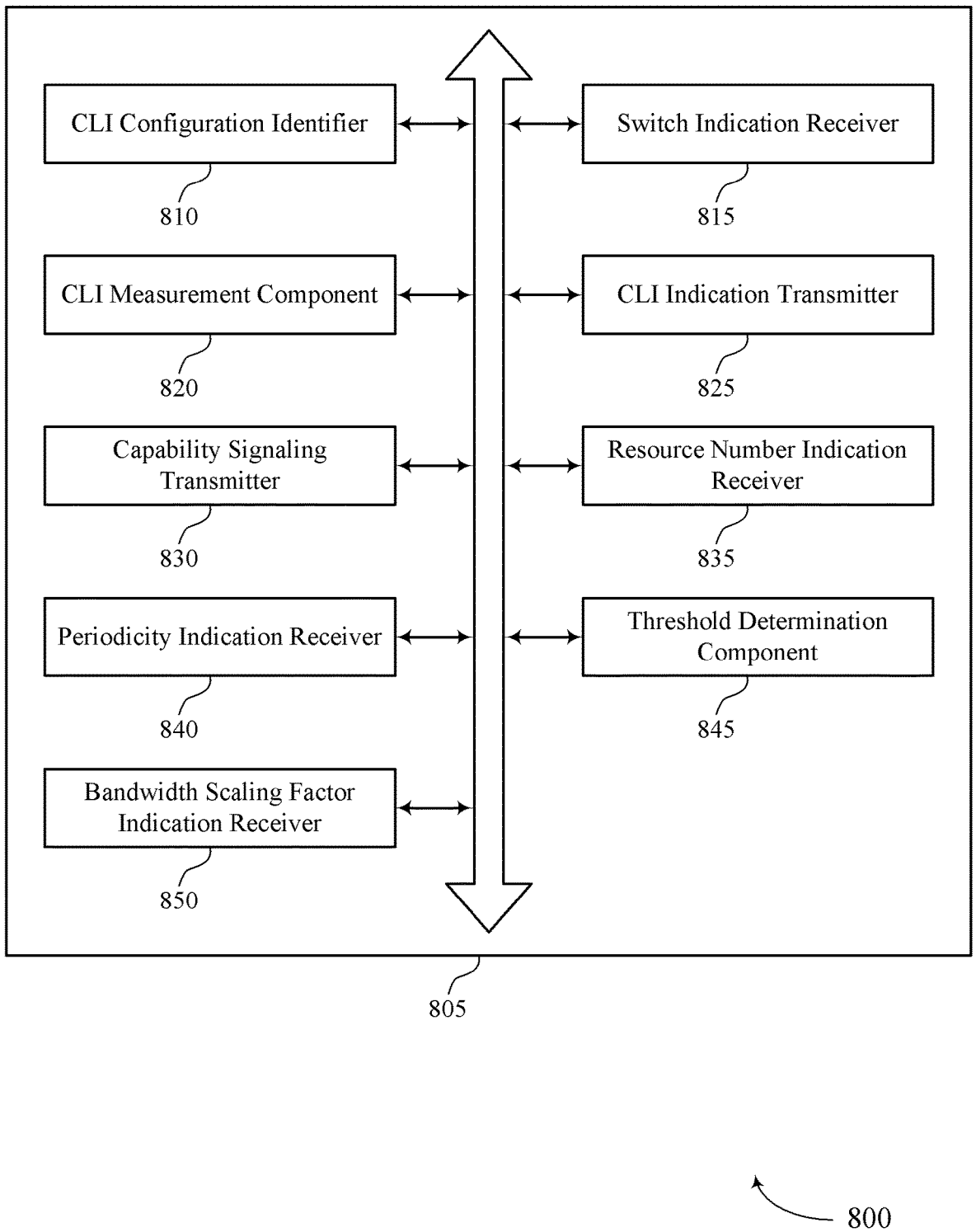
FIG. 8 shows a block diagram of a communication manager that supports cross-link interference measurement for a dormant mode in accordance with aspects of the present disclosure.

FIG. 8 shows a block diagram 800 of a communication manager 805 that supports cross-link interference measurement for a dormant mode in accordance with aspects of the present disclosure. The communication manager 805 may be an example of aspects of a communication manager 615, a communication manager 715, or a communication manager 910 described herein. The communication manager 805 may include a CLI configuration identifier 810, a switch indication receiver 815, a CLI measurement component 820, a CLI indication transmitter 825, a capability signaling transmitter 830, a resource number indication receiver 835, a periodicity indication receiver 840, a threshold determination component 845, and a bandwidth scaling factor indication receiver 850. Each of these modules may communicate, directly or indirectly, with one another (e.g., via one or more buses).

The CLI configuration identifier 810 may identify a first configuration for measuring cross-link interference in a first operation mode for a cell. In some examples, the CLI configuration identifier 810 may identify a second configuration for measuring the cross-link interference in the second operation mode. In some examples, the CLI configuration identifier 810 may identify that the UE supports a first cross-link interference measurement type, a second cross-link interference measurement type, or both, where the second configuration is associated with one or more resources of the first cross-link interference measurement type and unassociated with any resource of the second cross-link interference measurement type. In some examples, the CLI configuration identifier 810 may identify a first maximum number of resources for measuring the cross-link interference in the first operation mode.

In some examples, the CLI configuration identifier 810 may identify a set of resources for measuring the cross-link interference in the first operation mode. In some examples, the CLI configuration identifier 810 may determine a maximum number of resources for measuring the cross-link interference in the second operation mode, where the maximum number is smaller than a total number of resources in the set of resources. In some examples, the CLI configuration identifier 810 may select a subset of the set of resources based on the determined maximum number of resources, where identifying the second configuration is based on the selected subset.

In some examples, the CLI configuration identifier 810 may identify a first minimum periodicity for measuring the cross-link interference in the first operation mode. In some examples, the CLI configuration identifier 810 may identify a first minimum periodicity for measuring the cross-link interference in the first operation mode. In some examples, the CLI configuration identifier 810 may determine a second minimum periodicity for measuring the cross-link interference in the second operation mode, where the second minimum periodicity is larger than the first minimum periodicity, and where measuring the cross-link interference in the second operation mode is based on the second minimum periodicity. In some examples, the CLI configuration identifier 810 may determine that a minimum periodicity for measuring the cross-link interference in the first operation mode is above a threshold periodicity, where measuring the cross-link interference in the second operation mode is based on the minimum periodicity being above the threshold periodicity.

In some examples, the CLI configuration identifier 810 may determine a reduced bandwidth for measuring the cross-link interference associated with the second configuration based on the indication of the measurement bandwidth scaling factor, where measuring the cross-link interference is based on the reduced bandwidth. In some examples, the first operation mode may be associated with a first bandwidth part and the second operation mode may be associated with a second bandwidth part, where the cross-link interference is measured over the second bandwidth part.

The switch indication receiver 815 may receive an indication to switch to a second operation mode for the cell. In some examples, the indication to switch is provided via a downlink control information message.

The CLI measurement component 820 may measure the cross-link interference in the second operation mode based on the identified second configuration and receiving the indication to switch to the second operation mode. In some examples, the CLI measurement component 820 may refrain from measuring the cross-link interference over a third resource based on the third resource being outside of a threshold time.

The CLI indication transmitter 825 may transmit an indication of the measured cross-link interference.

The capability signaling transmitter 830 may transmit signaling indicating a capability of the UE to measure the cross-link interference in the first operation mode. In some examples, the capability signaling transmitter 830 may transmit second signaling indicating a second capability of the UE to measure the cross-link interference in the second operation mode, where identifying the second configuration is based on the second capability. In some cases, the second capability indicates whether the UE supports a first cross-link interference measurement type, a second cross-link interference measurement type, or both. In some cases, the second capability indicates a maximum number of resources configured for the first cross-link interference measurement type, a maximum number of resources configured for the second cross-link interference measurement type, or both. In some cases, the first cross-link interference measurement type includes a received signal strength indicator measurement and the second cross-link interference measurement type includes a reference signal received power measurement.

The resource number indication receiver 835 may receive an indication of a second maximum number of resources for measuring the cross-link interference in the second operation mode, where the second maximum number is less than the first maximum number based on the second maximum number being associated with the second operation mode, and where measuring the cross-link interference in the second operation mode is based on the second maximum number.

The periodicity indication receiver 840 may receive an indication of a second minimum periodicity associated with the second operation mode, where the second minimum periodicity is larger than the first minimum periodicity based on the second minimum periodicity being associated with the second operation mode, and where measuring the cross-link interference in the second operation mode is based on the second minimum periodicity. In some examples, the cross-link interference is measured over a first resource. In some such examples, the threshold determination component 845 may determine that the first resource is within a threshold time relative to a second resource for receiving a downlink transmission or transmitting an uplink transmission, where the cross-link interference over the first resource is based on the first resource being within the threshold time. The threshold determination component 845 may determine that a third resource is outside of the threshold time relative to the second resource. In some cases, the second resource includes a channel state information measurement resource or a resource for transmitting a sounding reference signal.

The bandwidth scaling factor indication receiver 850 may receive an indication of a measurement bandwidth scaling factor.

Figure 9:
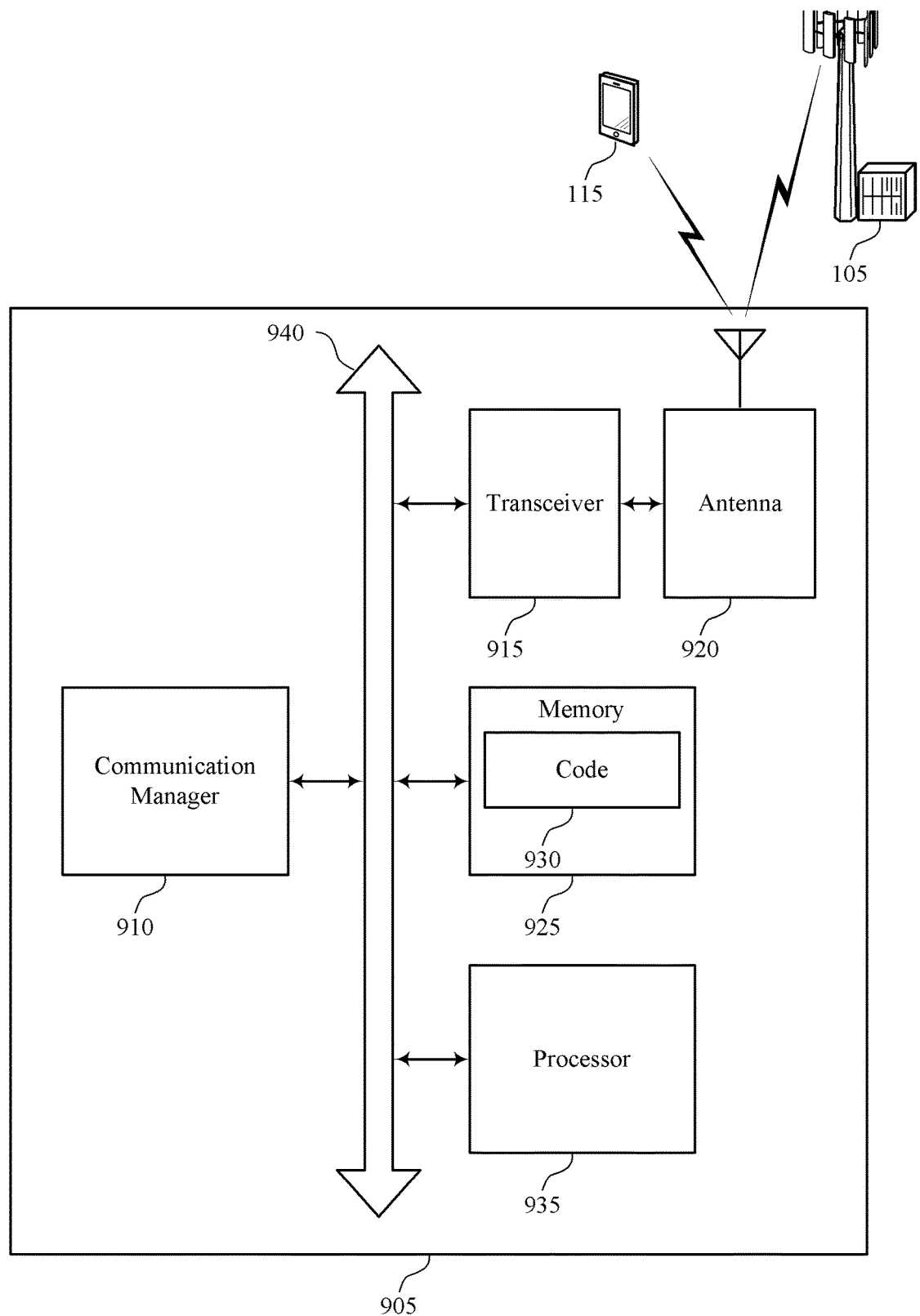
FIG. 9 shows a diagram of a system including a device that supports cross-link interference measurement for a dormant mode in accordance with aspects of the present disclosure.

FIG. 9 shows a diagram of a system 900 including a device 905 that supports cross-link interference measurement for a dormant mode in accordance with aspects of the present disclosure. The device 905 may be an example of or include the components of device 605, device 705, or a UE 115 as described herein. The device 905 may include components for bi-directional voice and data communications including components for transmitting and receiving communications, including a communication manager 910, a transceiver 915, an antenna 920, memory 925, and a processor 935. These components may be in electronic communication via one or more buses (e.g., bus 940).

The communication manager 910 may identify a first configuration for measuring cross-link interference in a first operation mode for a cell, receive an indication to switch to a second operation mode for the cell, identify a second configuration for measuring the cross-link interference in the second operation mode, measure the cross-link interference in the second operation mode based on the identified second configuration and receiving the indication to switch to the second operation mode, and transmit an indication of the measured cross-link interference.

The transceiver 915 may communicate bi-directionally, via one or more antennas, wired, or wireless links as described above. For example, the transceiver 915 may represent a wireless transceiver and may communicate bi-directionally with another wireless transceiver. The transceiver 915 may also include a modem to modulate the packets and provide the modulated packets to the antennas for transmission, and to demodulate packets received from the antennas.

In some cases, the wireless device may include a single antenna 920. However, in some cases the device may have more than one antenna 920, which may be capable of concurrently transmitting or receiving multiple wireless transmissions.

The memory 925 may include random-access memory (RAM) and read-only memory (ROM). The memory 925 may store computer-readable, computer-executable code 930 including instructions that, when executed, cause the processor to perform various functions described herein. In some cases, the memory 925 may contain, among other things, a basic input/output system (BIOS) which may control basic hardware or software operation such as the interaction with peripheral components or devices.

The code 930 may include instructions to implement aspects of the present disclosure, including instructions to support wireless communications. The code 930 may be stored in a non-transitory computer-readable medium such as system memory or other type of memory. In some cases, the code 930 may not be directly executable by the processor 935 but may cause a computer (e.g., when compiled and executed) to perform functions described herein.

The processor 935 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 935 may be configured to operate a memory array using a memory controller. In other cases, a memory controller may be integrated into the processor 935. The processor 935 may be configured to execute computer-readable instructions stored in a memory (e.g., the memory 925) to cause the device 905 to perform various functions (e.g., functions or tasks supporting cross-link interference measurement for a dormant mode).

Figure 10:
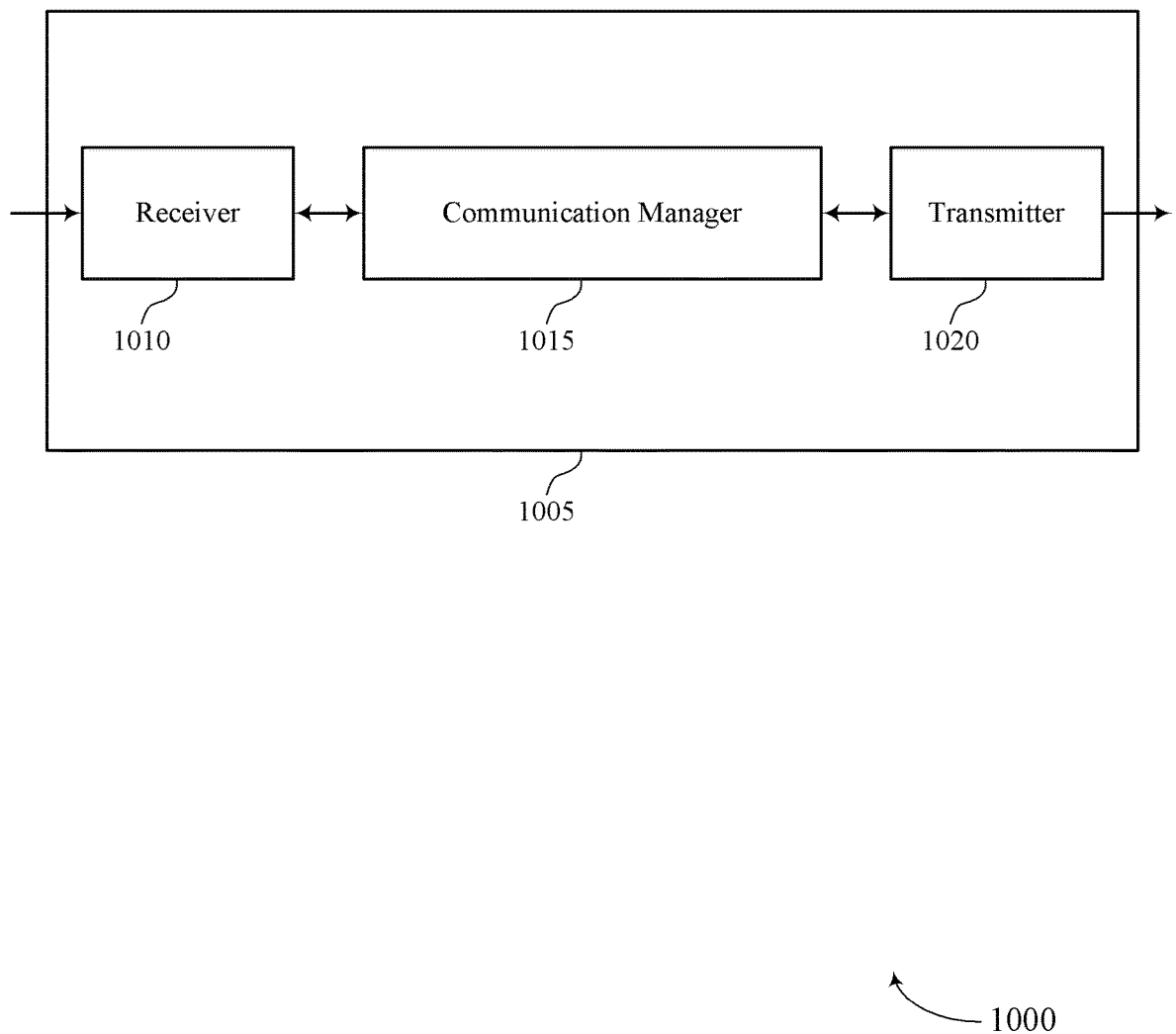
FIGS. 10 and 11 show block diagrams of devices that support cross-link interference measurement for a dormant mode in accordance with aspects of the present disclosure.

FIG. 10 shows a block diagram 1000 of a device 1005 that supports cross-link interference measurement for a dormant mode in accordance with aspects of the present disclosure. The device 1005 may be an example of aspects of a base station 105 as described herein. The device 1005 may include a receiver 1010, a communication manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to cross-link interference measurement for a dormant mode, etc.). Information may be passed on to other components of the device 1005. The receiver 1010 may be an example of aspects of the transceiver 1320 described with reference to FIG. 12. The receiver 1010 may utilize a single antenna or a set of antennas.

The communication manager 1015 may transmit, to a UE, an indication to switch from a first operation mode to a second operation mode, where the first operation mode is associated with a first configuration for measuring cross-link interference and the second operation mode is associated with a second configuration for measuring the cross-link interference and receive, from the UE, an indication of the measured cross-link interference based on the second configuration and transmitting the indication. The communication manager 1015 may be an example of aspects of the communication manager 1310 described herein.

The communication manager 1015, or its sub-components, may be implemented in hardware, code (e.g., software or firmware) executed by a processor, or any combination thereof. If implemented in code executed by a processor, the functions of the communication manager 1015, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communication manager 1015, or its sub-components, may be physically located at various positions, including being distributed such that portions of functions are implemented at different physical locations by one or more physical components. In some examples, the communication manager 1015, or its sub-components, may be a separate and distinct component in accordance with various aspects of the present disclosure. In some examples, the communication manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 12. The transmitter 1020 may utilize a single antenna or a set of antennas.

Figure 11:
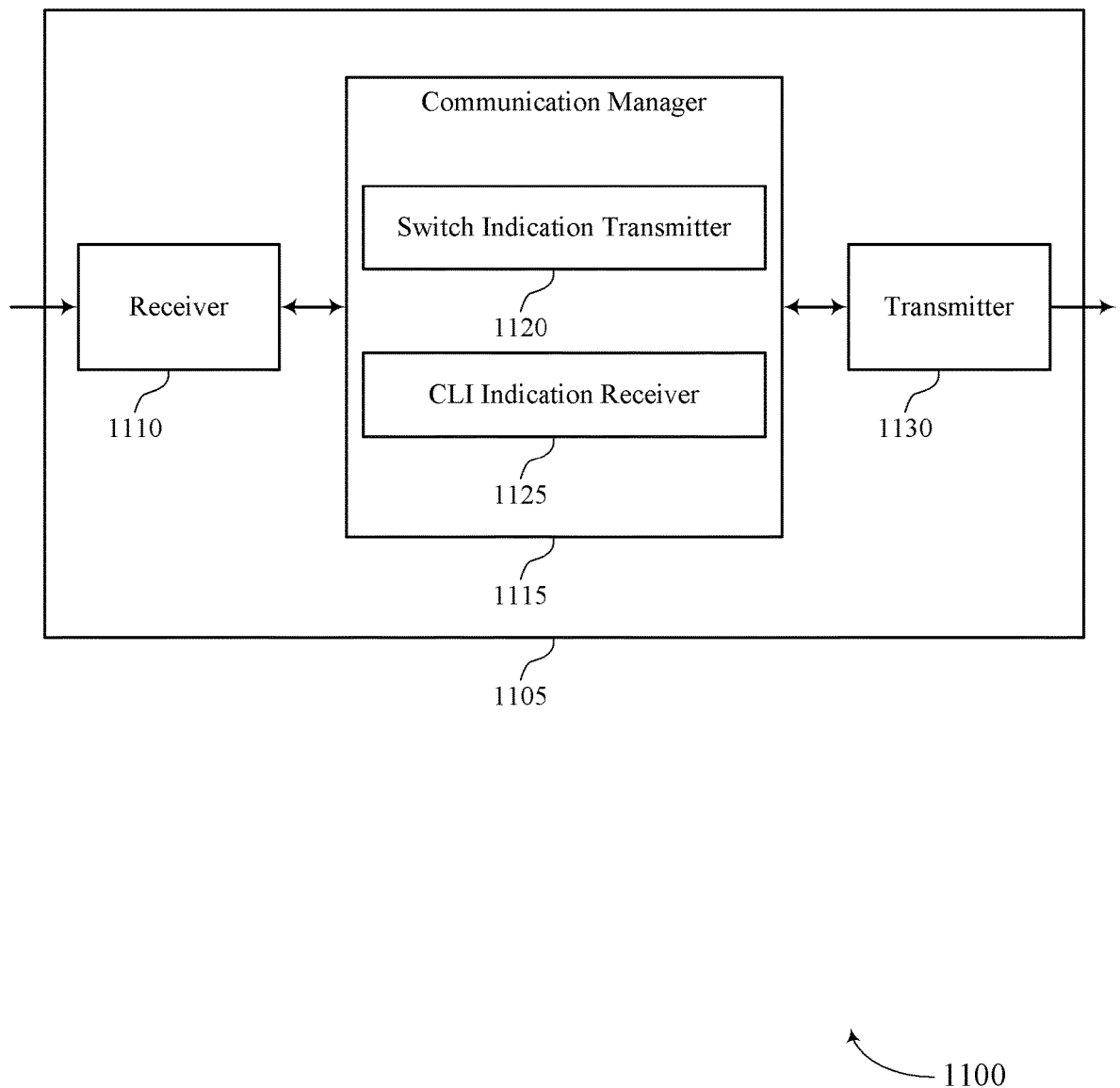

FIG. 11 shows a block diagram 1100 of a device 1105 that supports cross-link interference measurement for a dormant mode in accordance with aspects of the present disclosure. The device 1105 may be an example of aspects of a device 1005, or a base station 105 as described herein. The device 1105 may include a receiver 1110, a communication manager 1115, and a transmitter 1130. The device 1105 may also include a processor. Each of these components may be in communication with one another (e.g., via one or more buses).

The receiver 1110 may receive information such as packets, user data, or control information associated with various information channels (e.g., control channels, data channels, and information related to cross-link interference measurement for a dormant mode, etc.). Information may be passed on to other components of the device 1105. The receiver 1110 may be an example of aspects of the transceiver 1320 described with reference to FIG. 12. The receiver 1110 may utilize a single antenna or a set of antennas.

The communication manager 1115 may be an example of aspects of the communication manager 1015 as described herein. The communication manager 1115 may include a switch indication transmitter 1120 and a CLI indication receiver 1125. The communication manager 1115 may be an example of aspects of the communication manager 1310 described herein.

The switch indication transmitter 1120 may transmit, to a UE, an indication to switch from a first operation mode to a second operation mode, where the first operation mode is associated with a first configuration for measuring cross-link interference and the second operation mode is associated with a second configuration for measuring the cross-link interference.

The CLI indication receiver 1125 may receive, from the UE, an indication of the measured cross-link interference based on the second configuration and transmitting the indication.

The transmitter 1130 may transmit signals generated by other components of the device 1105. In some examples, the transmitter 1130 may be collocated with a receiver 1110 in a transceiver module. For example, the transmitter 1130 may be an example of aspects of the transceiver 1320 described with reference to FIG. 12. The transmitter 1130 may utilize a single antenna or a set of antennas.

Figure 12:
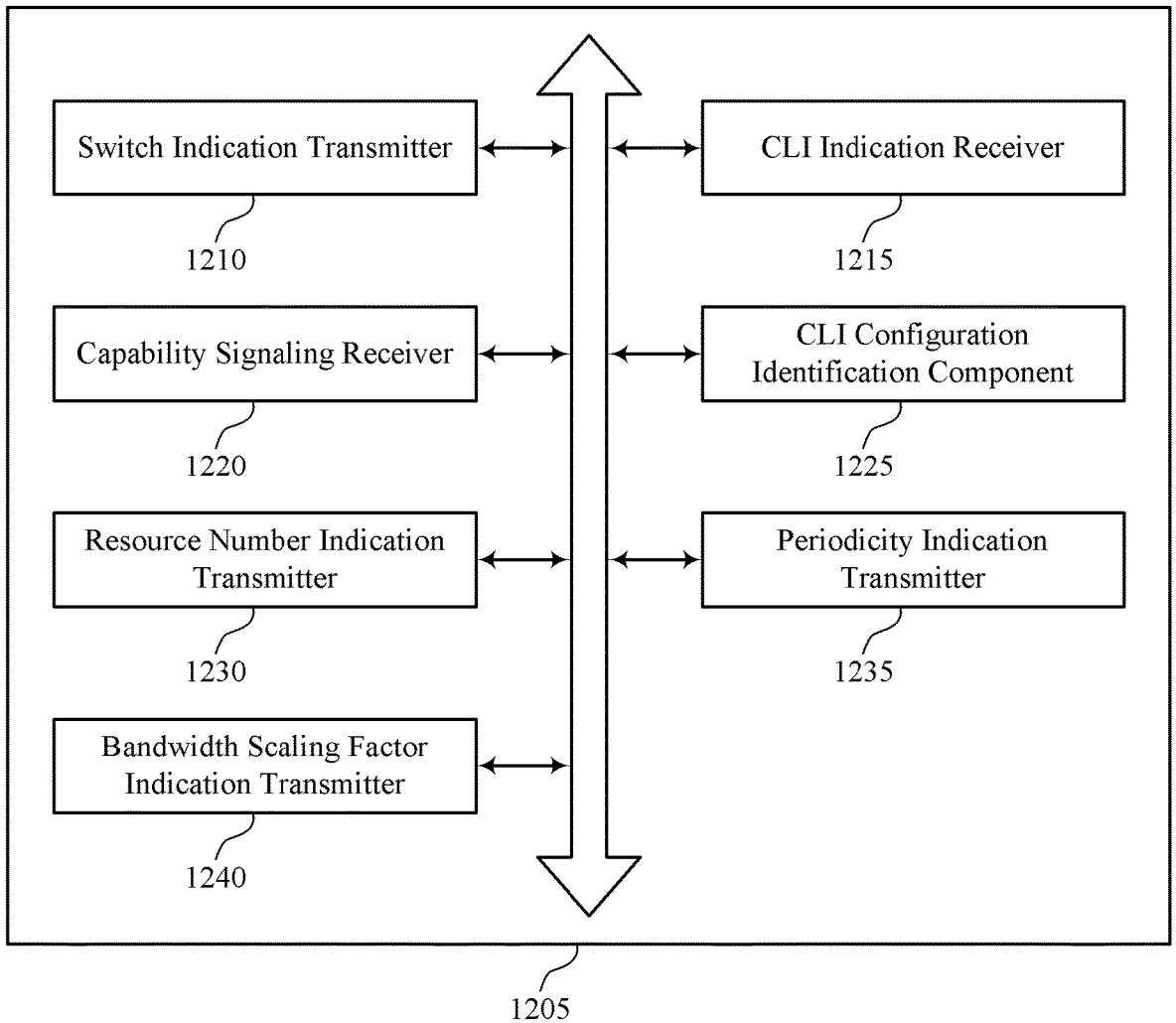
FIG. 12 shows a block diagram of a communication manager that supports cross-link interference measurement for a dormant mode in accordance with aspects of the present disclosure.

FIG. 12 shows a block diagram 1200 of a communication manager 1205 that supports cross-link interference measurement for a dormant mode in accordance with aspects of the present disclosure. The communication manager 1205 may be an example of aspects of a communication manager 1015, a communication manager 1115, or a communication manager 1310 described herein. The communication manager 1205 may include a switch indication transmitter 1210, a CLI indication receiver 1215, a capability signaling receiver 1220, a CLI configuration identification component 1225, a resource number indication transmitter 1230, a periodicity indication transmitter 1235, and a bandwidth scaling factor indication transmitter 1240. Each of these modules may communicate, directly or indirectly, with one another (e.g., via one or more buses).

The switch indication transmitter 1210 may transmit, to a UE, an indication to switch from a first operation mode to a second operation mode, where the first operation mode is associated with a first configuration for measuring cross-link interference and the second operation mode is associated with a second configuration for measuring the cross-link interference. In some cases, the first operation mode is associated with a first bandwidth part and the second operation mode is associated with a second bandwidth part, where the cross-link interference is measured over the second bandwidth part. In some cases, the indication to switch is provided via a downlink control information message.

The CLI indication receiver 1215 may receive, from the UE, an indication of the measured cross-link interference based on the second configuration and transmitting the indication.

The capability signaling receiver 1220 may receive signaling indicating a capability of the UE to measure the cross-link interference in the first operation mode. In some examples, the capability signaling receiver 1220 may receive second signaling indicating a second capability of the UE to measure the cross-link interference in the second operation mode where receiving the indication of the measured cross-link interference is based on receiving the second capability. In some cases, the second capability may indicate whether the UE supports a first cross-link interference measurement type, a second cross-link interference measurement type, or both. In some cases, the second capability may indicate a maximum number of resources configured for the first cross-link interference measurement type, a maximum number of resources configured for the second cross-link interference measurement type, or both. In some cases, the first cross-link interference measurement type includes a received signal strength indicator measurement, and the second cross-link interference measurement type includes a reference signal received power measurement.

The CLI configuration identification component 1225 may identify a first maximum number of resources for measuring the cross-link interference in the first operation mode. In some examples, the CLI configuration identification component 1225 may identify a first minimum periodicity for measuring the cross-link interference in the first operation mode.

The resource number indication transmitter 1230 may transmit, to the UE, a second maximum number of resources for measuring the cross-link interference in the second operation mode, where the second maximum number is less than the first maximum number based on the second maximum number being associated with the second operation mode.

The periodicity indication transmitter 1235 may transmit, to the UE, an indication of a second minimum periodicity associated with the second operation mode, where the second minimum periodicity larger than the first minimum periodicity based on the second minimum periodicity being associated with the second operation mode.

The bandwidth scaling factor indication transmitter 1240 may transmit, to the UE, an indication of a measurement bandwidth scaling factor, where receiving the indication of the measured cross-link interference is based on transmitting the indication of measurement bandwidth scaling factor.

Figure 13:
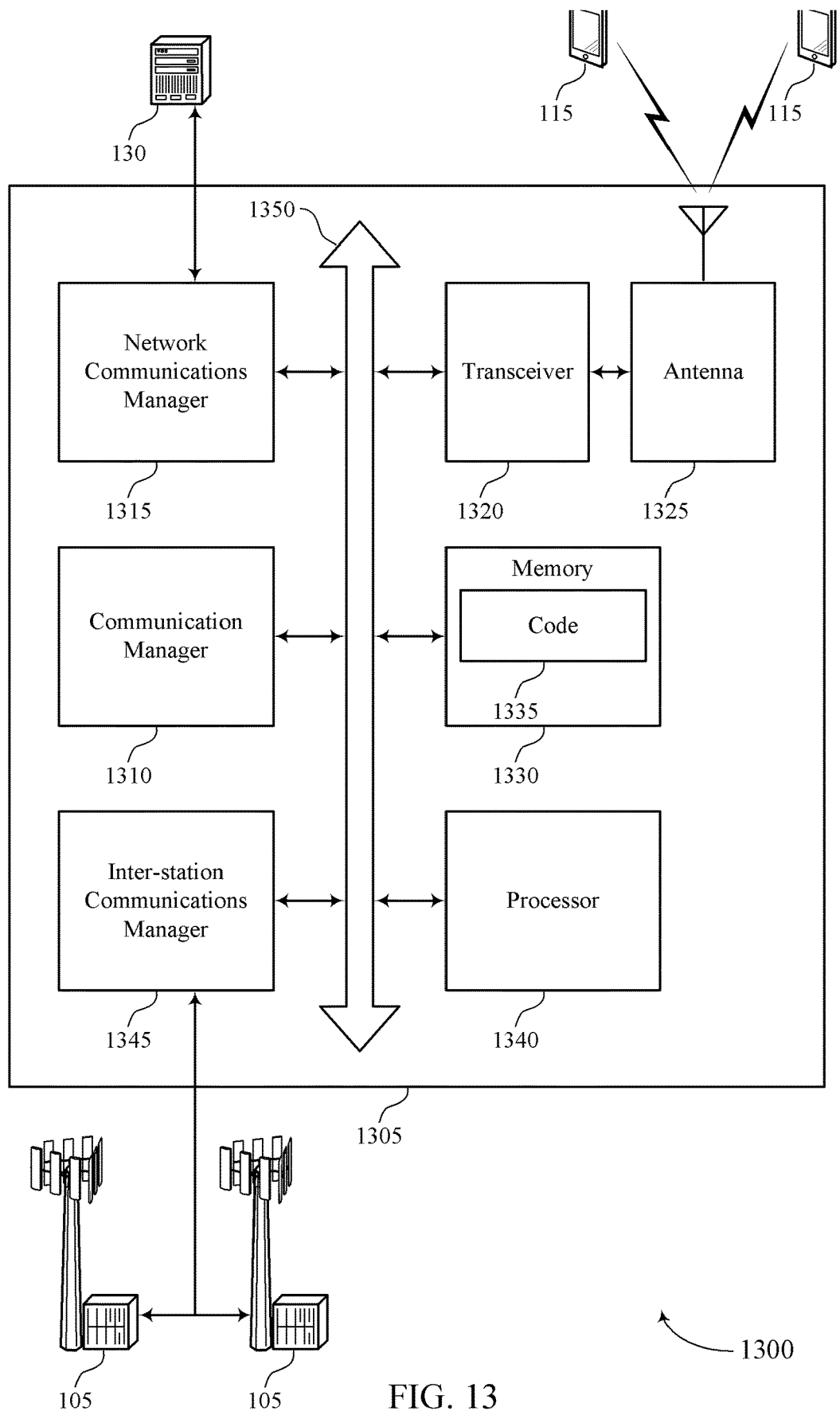
FIG. 13 shows a diagram of a system including a device that supports cross-link interference measurement for a dormant mode in accordance with aspects of the present disclosure.

FIG. 13 shows a diagram of a system 1300 including a device 1305 that supports cross-link interference measurement for a dormant mode in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communication manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communication manager 1310 may transmit, to a UE, an indication to switch from a first operation mode to a second operation mode, where the first operation mode is associated with a first configuration for measuring cross-link interference and the second operation mode is associated with a second configuration for measuring the cross-link interference and receive, from the UE, an indication of the measured cross-link interference based on the second configuration and transmitting the indication.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM and ROM. The memory 1330 may store computer-readable, computer-executable code 1335 including instructions that, when executed, cause the processor to perform various functions described herein. In some cases, the memory 1330 may contain, among other things, a BIOS which may control basic hardware or software operation such as the interaction with peripheral components or devices.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting cross-link interference measurement for a dormant mode).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

Figure 14:
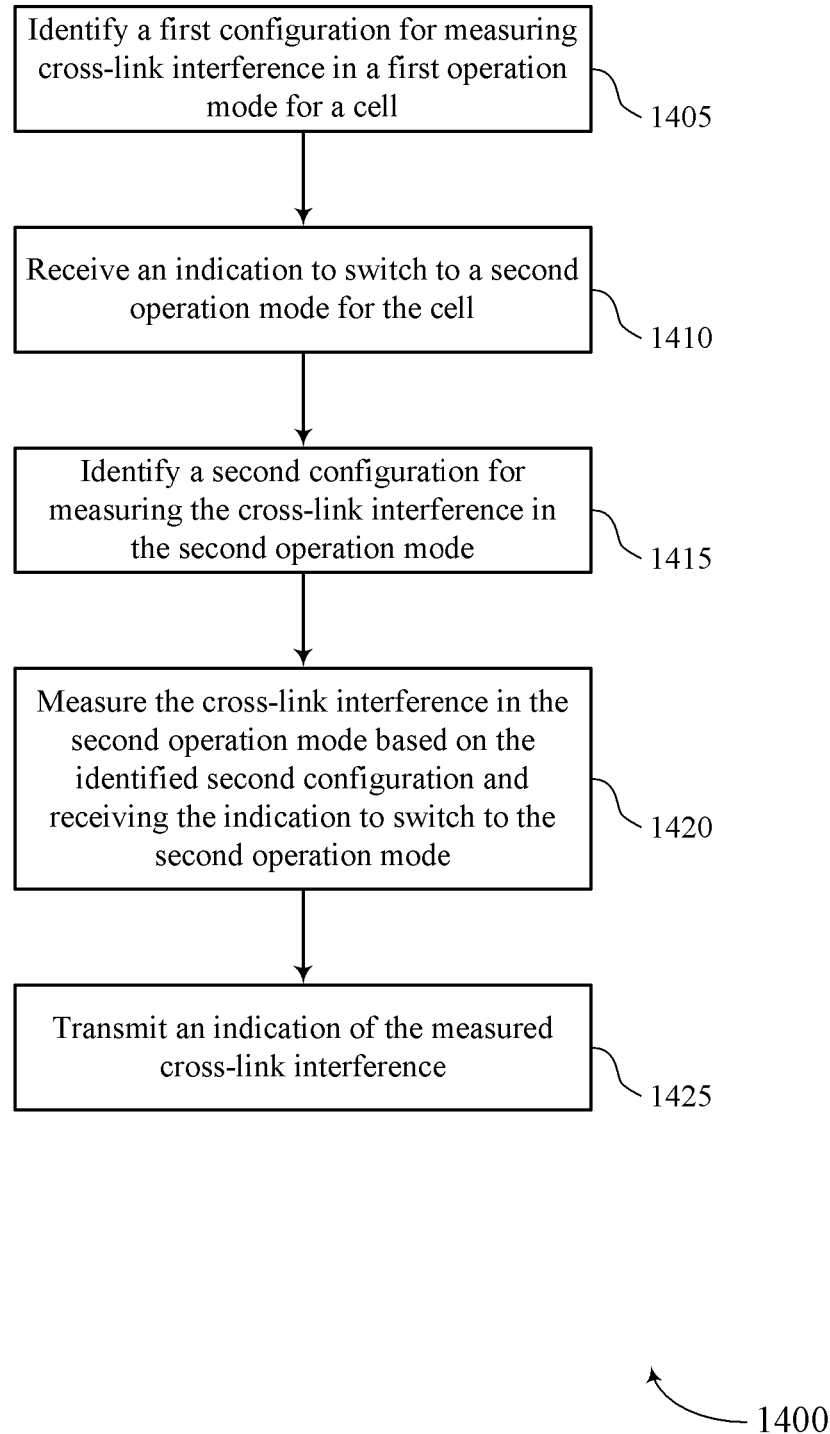
FIGS. 14 through 17 show flowcharts illustrating methods that support cross-link interference measurement for a dormant mode in accordance with aspects of the present disclosure.

FIG. 14 shows a flowchart illustrating a method 1400 that supports cross-link interference measurement for a dormant mode in accordance with aspects of the present disclosure. The operations of method 1400 may be implemented by a UE 115 or its components as described herein. For example, the operations of method 1400 may be performed by a communication manager as described with reference to FIGS. 6 through 9. In some examples, a UE may execute a set of instructions to control the functional elements of the UE to perform the described functions. Additionally, or alternatively, a UE may perform aspects of the described functions using special-purpose hardware.

At 1405, the UE may identify a first configuration for measuring cross-link interference in a first operation mode for a cell. Identifying the first configuration may involve receiving a measurement resource configuration from a base station indicating the first configuration. The operations of 1405 may be performed according to the methods described herein. In some examples, aspects of the operations of 1405 may be performed by a CLI configuration identifier as described with reference to FIGS. 6 through 9.

At 1410, the UE may receive an indication to switch to a second operation mode for the cell. Receiving the indication to switch may involve the UE receiving DCI that includes the indication to switch. The operations of 1410 may be performed according to the methods described herein. In some examples, aspects of the operations of 1410 may be performed by a switch indication receiver as described with reference to FIGS. 6 through 9.

At 1415, the UE may identify a second configuration for measuring the cross-link interference in the second operation mode. Identifying the second configuration may involve receiving a measurement resource configuration from a base station indicating the second configuration. The operations of 1415 may be performed according to the methods described herein. In some examples, aspects of the operations of 1415 may be performed by a CLI configuration identifier as described with reference to FIGS. 6 through 9.

At 1420, the UE may measure the cross-link interference in the second operation mode based on the identified second configuration and receiving the indication to switch to the second operation mode. Measuring the cross-link interference may involve the UE receiving an SRS and determining an RSRP of the SRS or determining an RSSI. The operations of 1420 may be performed according to the methods described herein. In some examples, aspects of the operations of 1420 may be performed by a CLI measurement component as described with reference to FIGS. 6 through 9.

At 1425, the UE may transmit an indication of the measured cross-link interference. The UE transmitting the indication of the measured cross-link interference may involve the UE transmitting RRC signaling including the indication of the measured cross-link interference. The operations of 1425 may be performed according to the methods described herein. In some examples, aspects of the operations of 1425 may be performed by a CLI indication transmitter as described with reference to FIGS. 6 through 9.

Figure 15:
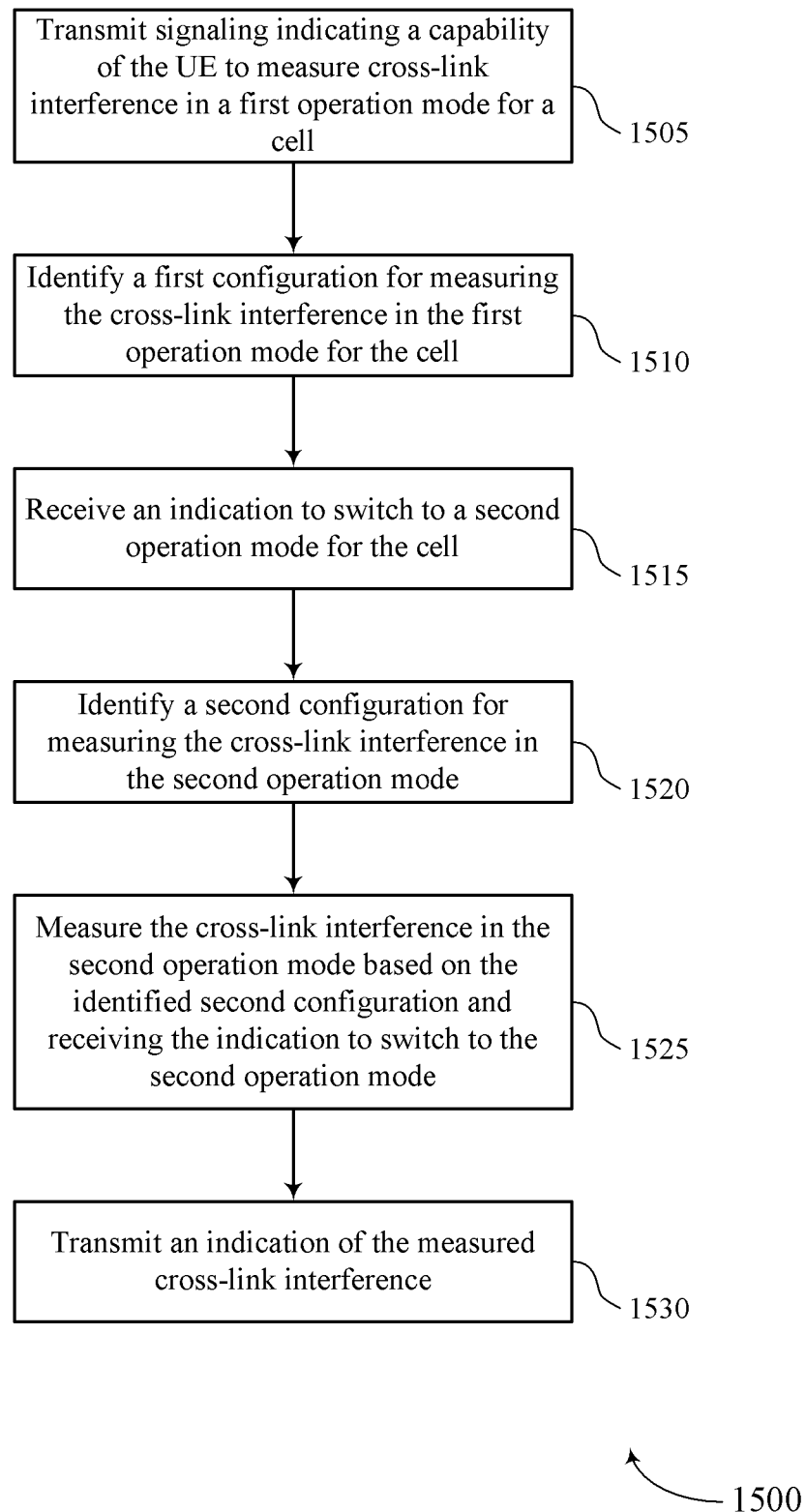

FIG. 15 shows a flowchart illustrating a method 1500 that supports cross-link interference measurement for a dormant mode in accordance with aspects of the present disclosure. The operations of method 1500 may be implemented by a UE 115 or its components as described herein. For example, the operations of method 1500 may be performed by a communication manager as described with reference to FIGS. 6 through 9. In some examples, a UE may execute a set of instructions to control the functional elements of the UE to perform the described functions. Additionally, or alternatively, a UE may perform aspects of the described functions using special-purpose hardware.

At 1505, the UE may transmit signaling indicating a capability of the UE to measure cross-link interference in a first operation mode for a cell. The UE transmitting the signaling may involve transmitting RRC signaling indicating the capability. The operations of 1505 may be performed according to the methods described herein. In some examples, aspects of the operations of 1505 may be performed by a capability signaling transmitter as described with reference to FIGS. 6 through 9.

At 1510, the UE may identify a first configuration for measuring the cross-link interference in the first operation mode for the cell. Identifying the first configuration may involve receiving a measurement resource configuration from a base station indicating the first configuration. The operations of 1510 may be performed according to the methods described herein. In some examples, aspects of the operations of 1510 may be performed by a CLI configuration identifier as described with reference to FIGS. 6 through 9.

At 1515, the UE may receive an indication to switch to a second operation mode for the cell. Receiving the indication to switch may involve the UE receiving DCI that includes the indication to switch. The operations of 1515 may be performed according to the methods described herein. In some examples, aspects of the operations of 1515 may be performed by a switch indication receiver as described with reference to FIGS. 6 through 9.

At 1520, the UE may identify a second configuration for measuring the cross-link interference in the second operation mode. The operations of 1520 may be performed according to the methods described herein. In some examples, aspects of the operations of 1520 may be performed by a CLI configuration identifier as described with reference to FIGS. 6 through 9.

At 1525, the UE may measure the cross-link interference in the second operation mode based on the identified second configuration and receiving the indication to switch to the second operation mode. Measuring the cross-link interference may involve the UE receiving an SRS and determining an RSRP of the SRS or determining an RSSI. The operations of 1525 may be performed according to the methods described herein. In some examples, aspects of the operations of 1525 may be performed by a CLI measurement component as described with reference to FIGS. 6 through 9.

At 1530, the UE may transmit an indication of the measured cross-link interference. The UE transmitting the indication of the measured cross-link interference may involve the UE transmitting RRC signaling including the indication of the measured cross-link interference. The operations of 1530 may be performed according to the methods described herein. In some examples, aspects of the operations of 1530 may be performed by a CLI indication transmitter as described with reference to FIGS. 6 through 9.

Figure 16:
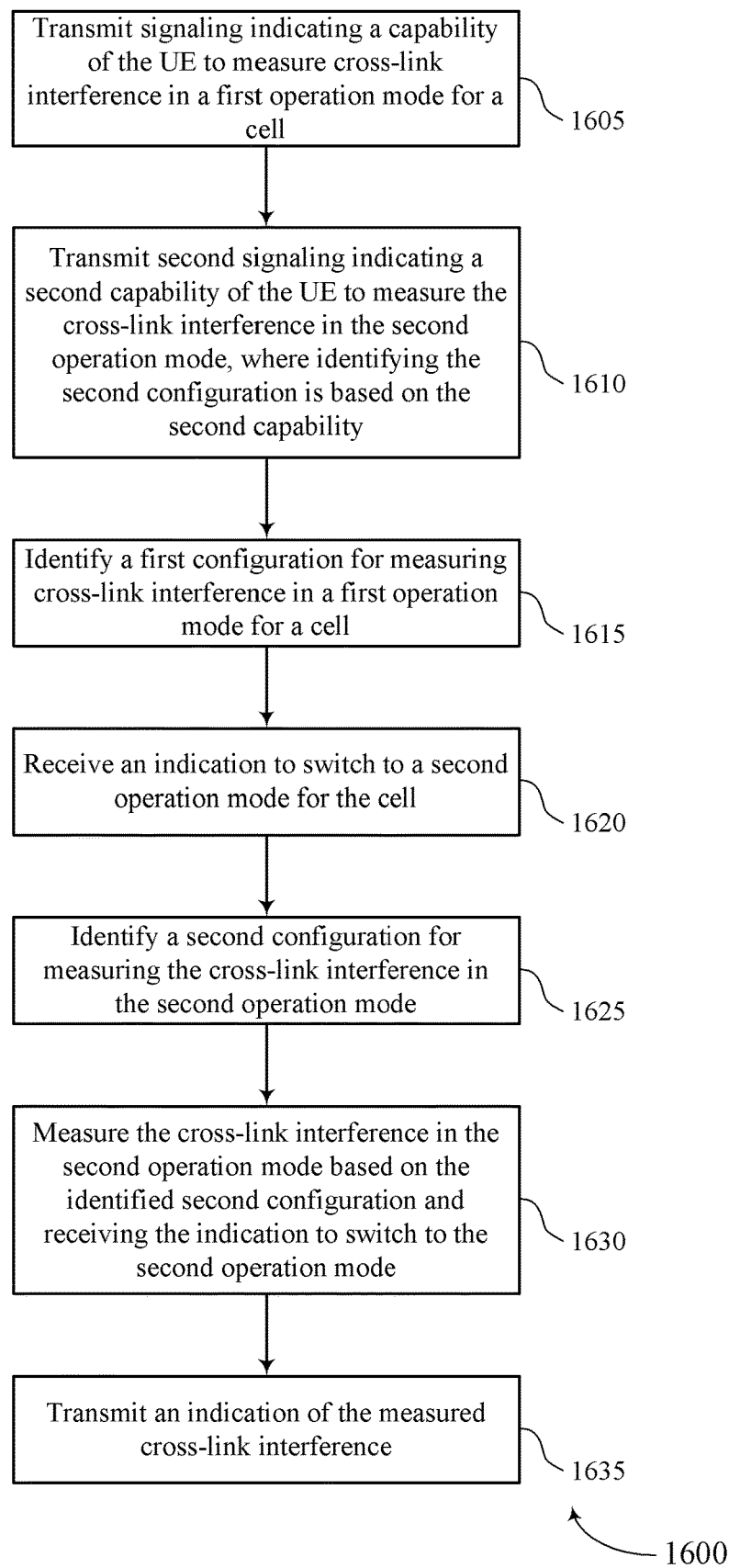

FIG. 16 shows a flowchart illustrating a method 1600 that supports cross-link interference measurement for a dormant mode in accordance with aspects of the present disclosure. The operations of method 1600 may be implemented by a UE 115 or its components as described herein. For example, the operations of method 1600 may be performed by a communication manager as described with reference to FIGS. 6 through 9. In some examples, a UE may execute a set of instructions to control the functional elements of the UE to perform the described functions. Additionally, or alternatively, a UE may perform aspects of the described functions using special-purpose hardware.

At 1605, the UE may transmit signaling indicating a capability of the UE to measure cross-link interference in a first operation mode for a cell. The UE transmitting the signaling may involve transmitting RRC signaling indicating the capability. The operations of 1605 may be performed according to the methods described herein. In some example, aspects of the operations of 1605 may be performed by a capability signaling transmitter as described with reference to FIGS. 6 through 9.

At 1610, the UE may transmit second signaling indicating a second capability of the UE to measure the cross-link interference in the second operation mode, where identifying the second configuration is based on the second capability. The UE transmitting the second signaling may involve transmitting RRC signaling indicating the second capability. The operations of 1610 may be performed according to the methods described herein. In some examples, aspects of the operations of 1610 may be performed by a capability signaling transmitter as described with reference to FIGS. 6 through 9.

At 1615, the UE may identify a first configuration for measuring cross-link interference in a first operation mode for a cell. Identifying the first configuration may involve receiving a measurement resource configuration from a base station indicating the first configuration. The operations of 1615 may be performed according to the methods described herein. In some examples, aspects of the operations of 1615 may be performed by a CLI configuration identifier as described with reference to FIGS. 6 through 9.

At 1620, the UE may receive an indication to switch to a second operation mode for the cell. Receiving the indication to switch may involve the UE receiving DCI that includes the indication to switch. The operations of 1620 may be performed according to the methods described herein. In some examples, aspects of the operations of 1620 may be performed by a switch indication receiver as described with reference to FIGS. 6 through 9.

At 1625, the UE may identify a second configuration for measuring the cross-link interference in the second operation mode. Identifying the second configuration may involve receiving a measurement resource configuration from a base station indicating the second configuration. The operations of 1625 may be performed according to the methods described herein. In some examples, aspects of the operations of 1625 may be performed by a CLI configuration identifier as described with reference to FIGS. 6 through 9.

At 1630, the UE may measure the cross-link interference in the second operation mode based on the identified second configuration and receiving the indication to switch to the second operation mode. Measuring the cross-link interference may involve the UE receiving an SRS and determining an RSRP of the SRS or determining an RSSI. The operations of 1630 may be performed according to the methods described herein. In some examples, aspects of the operations of 1630 may be performed by a CLI measurement component as described with reference to FIGS. 6 through 9.

At 1635, the UE may transmit an indication of the measured cross-link interference. The UE transmitting the indication of the measured cross-link interference may involve the UE transmitting RRC signaling including the indication of the measured cross-link interference. The operations of 1635 may be performed according to the methods described herein. In some examples, aspects of the operations of 1635 may be performed by a CLI indication transmitter as described with reference to FIGS. 6 through 9.

Figure 17:
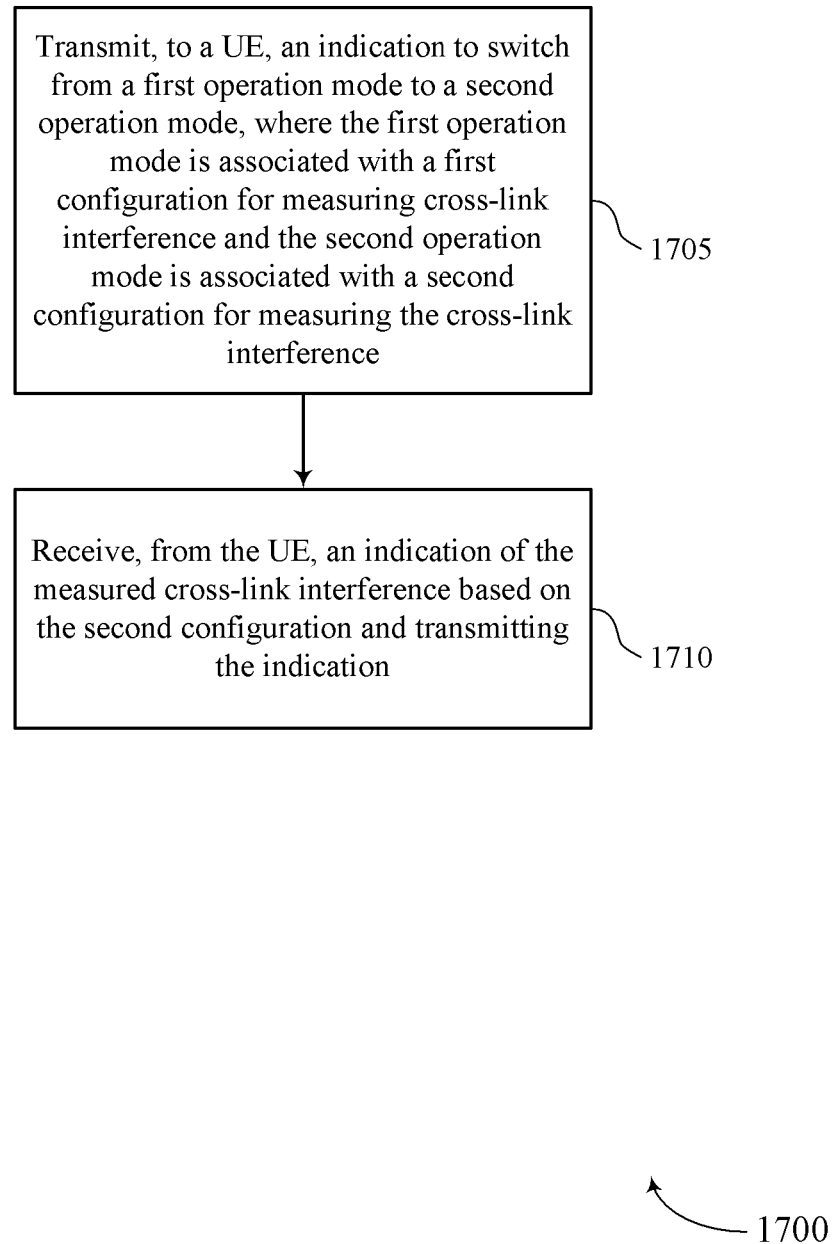

FIG. 17 shows a flowchart illustrating a method 1700 that supports cross-link interference measurement for a dormant mode in accordance with aspects of the present disclosure. The operations of method 1700 may be implemented by a base station 105 or its components as described herein. For example, the operations of method 1700 may be performed by a communication manager as described with reference to FIGS. 10 through 13. In some examples, a base station may execute a set of instructions to control the functional elements of the base station to perform the described functions. Additionally, or alternatively, a base station may perform aspects of the described functions using special-purpose hardware.

At 1705, the base station may transmit, to a UE, an indication to switch from a first operation mode to a second operation mode, where the first operation mode is associated with a first configuration for measuring cross-link interference and the second operation mode is associated with a second configuration for measuring the cross-link interference. The operations of 1705 may be performed according to the methods described herein. In some examples, aspects of the operations of 1705 may be performed by a switch indication transmitter as described with reference to FIGS. 10 through 13.

At 1710, the base station may receive, from the UE, an indication of the measured cross-link interference based on the second configuration and transmitting the indication. The operations of 1710 may be performed according to the methods described herein. In some examples, aspects of the operations of 1710 may be performed by a CLI indication receiver as described with reference to FIGS. 10 through 13.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:

identifying a first configuration for measuring cross-link interference in a first operation mode for a cell;
receiving an indication to switch to a second operation mode for the cell;
identifying a second configuration for measuring the cross-link interference in the second operation mode;
measuring the cross-link interference in the second operation mode based at least in part on the identified second configuration and receiving the indication to switch to the second operation mode; and
transmitting an indication of the measured cross-link interference.

2. The method of claim 1, further comprising:
transmitting signaling indicating a capability of the UE to measure the cross-link interference in the first operation mode.

3. The method of claim 2, further comprising:
transmitting second signaling indicating a second capability of the UE to measure the cross-link interference in the second operation mode, wherein identifying the second configuration is based at least in part on the second capability.

4. The method of claim 3, wherein the second capability indicates whether the UE supports a first cross-link interference measurement type, a second cross-link interference measurement type, or both.

5. The method of claim 4, wherein the second capability indicates a maximum number of resources configured for the first cross-link interference measurement type, a maximum number of resources configured for the second cross-link interference measurement type, or both.

6. The method of claim 4, wherein the first cross-link interference measurement type comprises a received signal strength indicator measurement and the second cross-link interference measurement type comprises a reference signal received power measurement.

7. A method for wireless communications, comprising:
transmitting, to a user equipment (UE), an indication to switch from a first operation mode to a second operation mode, wherein the first operation mode is associated with a first configuration for measuring cross-link interference and the second operation mode is associated with a second configuration for measuring the cross-link interference; and
receiving, from the UE, an indication of the measured cross-link interference based at least in part on the second configuration and transmitting the indication.

8. The method of claim 7, further comprising:
receiving signaling indicating a capability of the UE to measure the cross-link interference in the first operation mode.

9. The method of claim 8, further comprising:
receiving second signaling indicating a second capability of the UE to measure the cross-link interference in the second operation mode wherein receiving the indication of the measured cross-link interference is based at least in part on receiving the second capability.

10. The method of claim 9, wherein the second capability indicates whether the UE supports a first cross-link interference measurement type, a second cross-link interference measurement type, or both.

11. The method of claim 10, wherein the second capability indicates a maximum number of resources configured for the first cross-link interference measurement type, a maximum number of resources configured for the second cross-link interference measurement type, or both.

12. The method of claim 10, wherein the first cross-link interference measurement type comprises a received signal strength indicator measurement, and the second cross-link interference measurement type comprises a reference signal received power measurement.

13. An apparatus for wireless communication at a user equipment (UE), comprising:
a processor,
memory in electronic communication with the processor, and
instructions stored in the memory and executable by the processor to cause the apparatus to:
identify a first configuration for measuring cross-link interference in a first operation mode for a cell;
receive an indication to switch to a second operation mode for the cell;
identify a second configuration for measuring the cross-link interference in the second operation mode;
measure the cross-link interference in the second operation mode based at least in part on the identified second configuration and receiving the indication to switch to the second operation mode; and
transmit an indication of the measured cross-link interference.

14. The apparatus of claim 13, wherein the instructions are further executable by the processor to cause the apparatus to:
transmit signaling indicating a capability of the UE to measure the cross-link interference in the first operation mode.

15. The apparatus of claim 14, wherein the instructions are further executable by the processor to cause the apparatus to:
transmit second signaling indicating a second capability of the UE to measure the cross-link interference in the second operation mode, wherein identifying the second configuration is based at least in part on the second capability.

16. The apparatus of claim 15, wherein the second capability indicates whether the UE supports a first cross-link interference measurement type, a second cross-link interference measurement type, or both.

17. The apparatus of claim 16, wherein the second capability indicates a maximum number of resources configured for the first cross-link interference measurement type, a maximum number of resources configured for the second cross-link interference measurement type, or both.

18. The apparatus of claim 16, wherein the first cross-link interference measurement type comprises a received signal strength indicator measurement and the second cross-link interference measurement type comprises a reference signal received power measurement.

19. The apparatus of claim 13, wherein the instructions are further executable by the processor to cause the apparatus to:
identify that the UE supports a first cross-link interference measurement type, a second cross-link interference measurement type, or both, wherein the second configuration is associated with one or more resources of the first cross-link interference measurement type and unassociated with any resource of the second cross-link interference measurement type.

20. The apparatus of claim 13, wherein the instructions are further executable by the processor to cause the apparatus to:

identify a first maximum number of resources, a first minimum periodicity, or both for measuring the cross-link interference in the first operation mode; and receive an indication of a second maximum number of resources, a second minimum periodicity, or both for measuring the cross-link interference in the second operation mode, wherein the second maximum number is less than the first maximum number based at least in part on the second maximum number being associated with the second operation mode, the second minimum periodicity is larger than the first minimum periodicity based at least in part on the second minimum periodicity being associated with the second operation mode, or both, and wherein measuring the cross-link interference in the second operation mode is based at least in part on the second maximum number, the second minimum periodicity, or both.

21. The apparatus of claim 13, wherein the instructions are further executable by the processor to cause the apparatus to:
identify a set of resources for measuring the cross-link interference in the first operation mode;
determine a maximum number of resources for measuring the cross-link interference in the second operation mode, wherein the maximum number is smaller than a total number of resources in the set of resources; and
select a subset of the set of resources based at least in part on the determined maximum number of resources, wherein identifying the second configuration is based at least in part on the selected subset.

22. The apparatus of claim 13, wherein the instructions are further executable by the processor to cause the apparatus to:
identify a first minimum periodicity for measuring the cross-link interference in the first operation mode; and
determine a second minimum periodicity for measuring the cross-link interference in the second operation mode, wherein the second minimum periodicity is larger than the first minimum periodicity, and wherein measuring the cross-link interference in the second operation mode is based at least in part on the second minimum periodicity.

23. The apparatus of claim 13, wherein the instructions are further executable by the processor to cause the apparatus to:
determine that a minimum periodicity for measuring the cross-link interference in the first operation mode is above a threshold periodicity, wherein measuring the cross-link interference in the second operation mode is based at least in part on the minimum periodicity being above the threshold periodicity.

24. The apparatus of claim 13, wherein the first operation mode is associated with a first bandwidth part and the second operation mode is associated with a second bandwidth part, and wherein the cross-link interference is measured over the second bandwidth part.

25. The apparatus of claim 13, wherein the indication to switch is provided via a downlink control information message.

26. An apparatus for wireless communications, comprising:
a processor,
memory in electronic communication with the processor, and
instructions stored in the memory and executable by the processor to cause the apparatus to:

transmit, to a user equipment (UE), an indication to switch from a first operation mode to a second operation mode, wherein the first operation mode is associated with a first configuration for measuring cross-link interference and the second operation mode is associated with a second configuration for measuring the cross-link interference; and
receive, from the UE, an indication of the measured cross-link interference based at least in part on the second configuration and transmitting the indication.

27. The apparatus of claim 26, wherein the instructions are further executable by the processor to cause the apparatus to:
receive signaling indicating a capability of the UE to measure the cross-link interference in the first operation mode.

28. The apparatus of claim 27, wherein the instructions are further executable by the processor to cause the apparatus to:
receive second signaling indicating a second capability of the UE to measure the cross-link interference in the second operation mode wherein receiving the indication of the measured cross-link interference is based at least in part on receiving the second capability.

29. The apparatus of claim 28, wherein the second capability indicates whether the UE supports a first cross-link interference measurement type, a second cross-link interference measurement type, or both.

30. The apparatus of claim 29, wherein the second capability indicates a maximum number of resources configured for the first cross-link interference measurement type, a maximum number of resources configured for the second cross-link interference measurement type, or both.

31. The apparatus of claim 29, wherein the first cross-link interference measurement type comprises a received signal strength indicator measurement, and the second cross-link interference measurement type comprises a reference signal received power measurement.

32. The apparatus of claim 26, wherein the instructions are further executable by the processor to cause the apparatus to:
identify a first maximum number of resources, a first minimum periodicity, or both for measuring the cross-link interference in the first operation mode; and
transmit, to the UE, a second maximum number of resources, a second minimum periodicity, or both for measuring the cross-link interference in the second operation mode, wherein the second maximum number is less than the first maximum number based at least in part on the second maximum number being associated with the second operation mode, the second minimum periodicity larger than the first minimum periodicity based at least in part on the second minimum periodicity being associated with the second operation mode, or both.

33. The apparatus of claim 26, wherein the first operation mode is associated with a first bandwidth part and the second operation mode is associated with a second bandwidth part, and wherein the cross-link interference is measured over the second bandwidth part.

34. The apparatus of claim 26, wherein the indication to switch is provided via a downlink control information message.

35. A non-transitory computer-readable medium storing code for wireless communication at a user equipment (UE), the code comprising instructions executable by a processor to:

identify a first configuration for measuring cross-link interference in a first operation mode for a cell;
receive an indication to switch to a second operation mode for the cell;
identify a second configuration for measuring the cross-link interference in the second operation mode;
measure the cross-link interference in the second operation mode based at least in part on the identified second configuration and receiving the indication to switch to the second operation mode; and
transmit an indication of the measured cross-link interference.

* * * * *